US012044921B2

United States Patent
Mansha et al.

(10) Patent No.: US 12,044,921 B2
(45) Date of Patent: Jul. 23, 2024

(54) SPATIAL LIGHT MODULATOR AND METHOD OF FORMING THE SAME

(71) Applicant: Agency for Science, Technology and Research, Singapore (SG)

(72) Inventors: Shampy Mansha, Singapore (SG); Ramon Jose Paniagua Dominguez, Singapore (SG); Arseniy Kuznetsov, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 18/008,520

(22) PCT Filed: Jun. 10, 2020

(86) PCT No.: PCT/SG2020/050324
§ 371 (c)(1),
(2) Date: Dec. 6, 2022

(87) PCT Pub. No.: WO2021/251898
PCT Pub. Date: Dec. 16, 2021

(65) Prior Publication Data
US 2023/0213811 A1 Jul. 6, 2023

(51) Int. Cl.
*G02F 1/1335* (2006.01)
(52) U.S. Cl.
CPC .. *G02F 1/133553* (2013.01); *G02F 1/133567* (2021.01); *G02F 2203/12* (2013.01)
(58) Field of Classification Search
None
See application file for complete search history.

(56) References Cited

U.S. PATENT DOCUMENTS

| 7,440,157 | B2 | 10/2008 | Woodall et al. |
| 2002/0140888 | A1 | 10/2002 | Nishiyama et al. |
| 2013/0058102 | A1* | 3/2013 | Lin .......... H01L 33/46 362/296.04 |

(Continued)

FOREIGN PATENT DOCUMENTS

| CN | 107357080 A | 11/2017 |
| WO | 2017135890 A1 | 8/2017 |

OTHER PUBLICATIONS

Makowski et al., "Performance of the 4k Phase-Only Spatial Light Modulator in Image Projection by Computer-Generated Holography," Photonics Letters of Poland, vol. 8 , No. 1, 2016, pp. 26-28.

(Continued)

*Primary Examiner* — Phu Vu
(74) *Attorney, Agent, or Firm* — Shackelford, McKinley & Norton, LLP

(57) ABSTRACT

A spatial light modulator and a method for forming the spatial light modulator. The spatial light modulator may include a first reflector. The spatial light modulator may also include a second reflector. The spatial light modulator may further include a liquid crystal layer between the first reflector and the second reflector. The first reflector may include a first electrode. The second reflector may include a second electrode. At least one reflector selected from the first reflector and the second reflector may be or may include a distributed Bragg reflector (DBR). The first reflector and the second reflector may form a Fabry-Perot (FP) cavity.

18 Claims, 25 Drawing Sheets

(56) References Cited

U.S. PATENT DOCUMENTS

| | | | |
|---|---|---|---|
| 2017/0082892 A1 | 3/2017 | Chung et al. | |
| 2018/0004045 A1 | 1/2018 | Chen et al. | |
| 2019/0049788 A1 | 2/2019 | Kuznetsov et al. | |
| 2019/0137815 A1 | 5/2019 | Kim et al. | |
| 2021/0255490 A1* | 8/2021 | Parsons | G02F 1/213 |

OTHER PUBLICATIONS

Thorlabs, "Exulus Spatial Light Modulator with Full HD Resolution," https://www.thorlabs.com/newgrouppage9.cfm?objectgroup_id=10378, 2022, pp. 1-5.

Li et al., "Infrared Refractive Indices of Liquid Crystals," Journal of Applied Physics, vol. 97, 2005, pp. 1-5.

Li et al., "Phase-Only Transmissive Spatial Light Modulator Based on Tunable Dielectric Metasurface," Science, vol. 364, 2019, pp. 1087-1090.

Yoon et al., "Transmission Type Color Filter Incorporating a Silver Film Based Etalon," Optics Express, vol. 18, No. 5. Mar. 1, 2010, pp. 1-6.

Inaba et al., "Degradation-Free MOS Image Sensor with Photonic Crystal Color Filter," IEEE Electron Device Letters, vol. 27, No. 6, Jun. 2006, pp. 457-459.

Horie et al., "Wide Bandwidth and High Resolution Planar Filter Array Based on DBR-Metasurface-DBR Structures," Optics Express, vol. 24, No. 11, May 30, 2016, pp. 11677-11682.

Lekenta et al., "Tunable Optical Spin Hall Effect in a Liquid Crystal Microcavity," Light: Science & Applications, vol. 7, No. 74, 2018, pp. 1-6.

Ding et al., "Reflectance Bandwidth and Efficiency Improvement of Light-Emitting Diodes with Double-Distributed Bragg Reflector," Applied Optics, vol. 56, No. 15, 2017, pp. 4375-4380.

Joannopoulos et al., "Photonic Crystals: Molding the Flow of Light," https://link.edgepilot.com/s/284c8029/N0XdWZJEX0_VHLW-BVXbrw?u=http://ab-initio.mit.edu/book/photonic-crystals-book.pdf, See Abstract, Feb. 2008, pp. 1-304.

Yu et al., "Light Propagation with Phase Discontinuities: Generalized Laws of Reflection and Refraction," Science, vol. 334, Issue 6054, Oct. 21, 2011, pp. 333-337.

Yu et al., "High-Transmission Dielectric Metasurface with 2TT Phase Control at Visible Wavelengths," Laser & Photonics Reviews, vol. 9, No. 4, 2015, pp. 412-418.

International Search Report for International Application No. PCT/SG2020/050324 dated Oct. 5, 2020, pp. 1-3.

Written Opinion of the International Searching Authority for International Application No. PCT/SG2020/050324 dated Oct. 5, 2020, pp. 1-5.

* cited by examiner

FIG. 14

| $\lambda_t$ | $\theta_1$ | $\theta_2$ | $\theta_3$ | $\theta_4$ | $\theta_5$ | $\theta_6$ | $\theta_7$ | $\theta_8$ |
|---|---|---|---|---|---|---|---|---|
| | 0 | $\frac{\pi}{4}$ | $\frac{\pi}{2}$ | $\frac{3\pi}{4}$ | $\pi$ | $\frac{5\pi}{4}$ | $\frac{3\pi}{2}$ | $\frac{7\pi}{4}$ |
| 465 nm | 0° | 43.2° | 46.3° | 47.5° | 48.6° | 49.6° | 51° | 54.4° |
| 532 nm | 0° | 46.3° | 48.2° | 48.8° | 49.5° | 50.1° | 51.2° | 52.9° |
| 645 nm | 0° | 40° | 42.9° | 44.7° | 46° | 47.3° | 49.6° | 55.9° |

FIG. 17

(a) $\lambda_B$ = 465 nm [maximum of (+1,0) occurs at $\lambda_m$ = 464 nm]

| (−1,0) | (0,0) | (+1,0) | total |
|---|---|---|---|
| 0 | 0.03 | 0.7 | 0.75 |

(b) $\lambda_G$ = 532 nm [maximum of (+1,0) occurs at $\lambda_m$ = 532 nm]

| (−1,0) | (0,0) | (+1,0) | total |
|---|---|---|---|
| 0.07 | 0.09 | 0.6 | 0.80 |

(c) $\lambda_R$ = 645 nm [maximum of (+1,0) occurs at $\lambda_m$ = 643 nm]

| (−1,0) | (0,0) | (+1,0) | total |
|---|---|---|---|
| 0.034 | 0.13 | 0.5 | 0.76 |

SPATIAL LIGHT MODULATOR AND METHOD OF FORMING THE SAME

TECHNICAL FIELD

Various aspects of this disclosure relate to a spatial light modulator. Various aspects of this disclosure relate to a method of forming a spatial light modulator.

BACKGROUND

A spatial light modulator (SLM) is a device which can be used to modulate the amplitude, phase or polarization of light. Liquid Crystal on Silicon (LCoS) are a type of SLM, which includes a liquid crystal (LC) layer between two conducting layers. In these devices, light can be modulated by tuning the orientation of the LC molecules (the so-called LC directors), which changes their refractive index, thus resulting in the phase retardation of light propagating through the cell. The orientation of the LC molecules may be changed by applying an electric field across the LC. The refractive index of the molecules may also be changed by varying temperature.

In such systems, the thickness of the LC layer ($d_{LC}$) determines the response time. The response time may be proportional to $d_{LC}^2$. As a rule, for a transmissive device, the LC cell should have a height of at least $d_{LC}=\lambda/\Delta n$ to provide $2\pi$ phase modulation, where $\lambda$ is the operational wavelength and $\Delta n$ is the birefringence coefficient of the LC (i.e. the difference between its extraordinary and ordinary refractive indices). For a reflective device, the height may be required to be half of that of the transmissive device, i.e. $d_{LC}=\lambda/2\Delta n$, The other factor limiting the adoption of LCoS SLMs is the large pixel size (the smallest commercially available pixel size in the best reflective SLM being ~3-4 μm), which renders the system bulky and decreases the field of view (FOV), which is inversely proportional to the pixel size. The pixel size is determined by the cross talk between adjacent pixels, which is, in turn, determined by the LC cell thickness (the smaller the cell thickness, the smaller the minimum pixel size possible without experiencing the undesirable cross talk).

Another kind of SLMs is based on metasurfaces (or nanoantenna arrays) embedded in the LC cell. In these devices, the phase accumulation is realized through the resonances excited in the nanoantennas and is, thus, uncoupled from the LC cell thickness. This allows for the shrinking of the pixel size down to the wavelength scale without introducing a significant cross talk between the pixels. However, since the spectral position of the nanoantenna resonances is dependent on geometry, these devices have the limitation of having a narrow operational bandwidth (being typically single-wavelength). In other words, in order for the SLM to achieve operation at another wavelength, the nanoantenna geometry would need to be modified, which is practically not possible once the device has been fabricated. Hence, another device would need to be fabricated to work at this other wavelength. Thus, this kind of devices may not be suitable to operate at multiple wavelengths.

As such, there is a requirement for a device which can address the problems as described above. Such a device should have a thin LC layer thickness so as to reduce the response time and the inter-pixel crosstalk, have a small pixel size to enable a large FOV, and can operate at multiple wavelengths simultaneously without modifying any structural parameters.

SUMMARY

Various embodiments may provide a spatial light modulator (SLM). The spatial light modulator may include a first reflector. The spatial light modulator may also include a second reflector. The spatial light modulator may further include a liquid crystal layer between the first reflector and the second reflector. The first reflector may include a first electrode. The second reflector may include a second electrode. At least one reflector selected from the first reflector and the second reflector may be or may include a distributed Bragg reflector (DBR). The first reflector and the second reflector may form a Fabry-Perot (FP) cavity.

Various embodiments may provide a method of forming a spatial light modulator (SLM). The method may include forming a first reflector. The method may include forming a second reflector. The method may also include forming a liquid crystal layer between the first reflector and the second reflector. The first reflector may include a first electrode. The second reflector may include a second electrode. At least one reflector selected from the first reflector and the second reflector may include or be a distributed Bragg reflector (DBR). The first reflector and the second reflector may form a (FP) Fabry-Perot cavity.

BRIEF DESCRIPTION OF THE DRAWINGS

The invention will be better understood with reference to the detailed description when considered in conjunction with the non-limiting examples and the accompanying drawings, in which:

FIG. 14 is a table showing the values of the liquid crystal (LC) orientation angles $\theta_{LC}$ required at each wavelength to achieve beam steering in the spatial light modulator (SLM) according to various embodiments.

FIG. 17 is a table showing the values of reflectance for the different diffraction orders at the three wavelengths of interest corresponding to three Fabry-Perot spatial light modulator (FP-SLM) configurations according to various embodiments.

DETAILED DESCRIPTION

Figure 1:
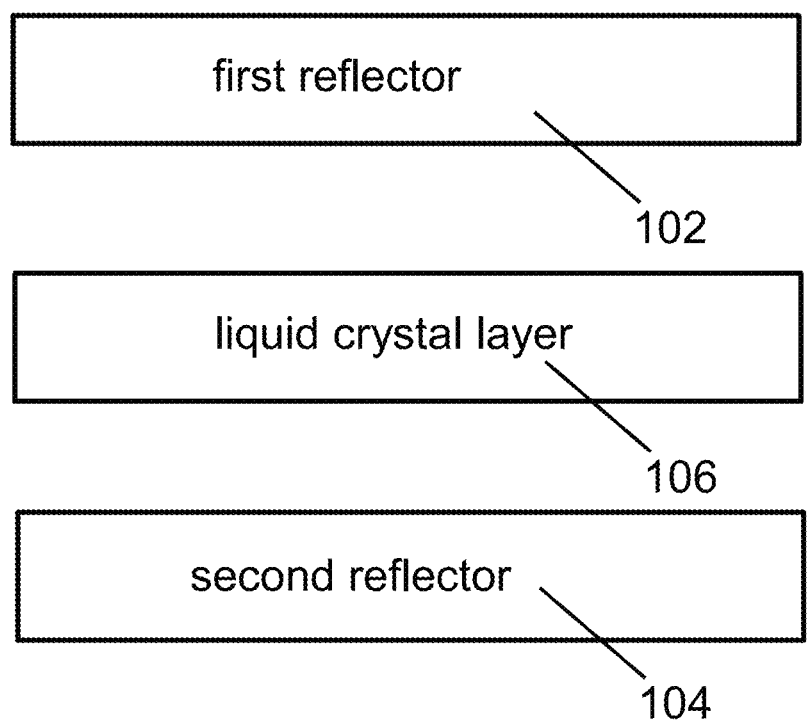
FIG. 1 is a general illustration of a spatial light modulator (SLM) according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or spatial light modulators is analogously valid for the other methods or spatial light modulators. Similarly, embodiments described in the context of a method are analogously valid for a spatial light modulator, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The spatial light modulator as described herein may be operable in various orientations, and thus it should be understood that the terms "top", "bottom", "upper", "lower" etc., when used in the following description are used for convenience and to aid understanding of relative positions or directions, and not intended to limit the orientation of the setup/apparatus.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may seek to address or mitigate at least some of the problems as described above. Various embodiments may (i) have a thin liquid crystal (LC) layer to reduce response time and inter-pixel crosstalk, (ii) have a small pixel size to enable a large field of view (FOV), and/or (iii) can operate at multiple wavelengths simultaneously without modifying any structural parameters.

FIG. 1 is a general illustration of a spatial light modulator (SLM) according to various embodiments. The spatial light modulator may include a first reflector 102. The spatial light modulator may also include a second reflector 104. The spatial light modulator may further include a liquid crystal layer 106 between the first reflector 102 and the second reflector 104. The first reflector 102 may include a first electrode. The second reflector 104 may include a second electrode. At least one reflector selected from the first reflector 102 and the second reflector 104 may be or may include a distributed Bragg reflector (DBR). The first reflector 102 and the second reflector 104 may form a Fabry-Perot (FP) cavity.

In other words, the SLM may include a first reflector 102 and a second reflector 104, which together may form a Fabry-Perot cavity. The SLM may include a liquid crystal layer 106 within the Fabry-Perot cavity. The first reflector 102 may generally refer to one or more layers at a first side of the liquid crystal layer 106, wherein at least one layer of the one or more layers is configured to reflect optical light or electromagnetic waves, i.e. being at least partially reflective. Likewise, the second reflector 104 may generally refer to one or more layers at a second side of the liquid crystal layer 106 opposite the first side, wherein at least one layer of the one or more layers is configured to reflect optical light or electromagnetic waves, i.e. being at least partially reflective. The first reflector 102, the second reflector 104, or both the first reflector 102 and the second reflector 104 may be or may include a DBR. The one of more layers at the first side of the liquid crystal layer 106 may include a first electrode. Likewise, the one or more layers at the second side of the liquid crystal layer 106 may include a second electrode. In some embodiments, the electrode may also help to reflect electromagnetic waves or optical light.

For avoidance of doubt, FIG. 1 serves to illustrate some of the features of a SLM according to various embodiments, and does not serve to limit, for instance, the size, orientation, shape, arrangement etc. of these features.

A Fabry-Perot cavity may be an optical cavity formed by two reflectors. The Fabry-Perot cavity may allow electromagnetic waves, e.g. optical light, to pass through only when the electromagnetic waves or optical light is in resonance with cavity.

The spatial light modulator (SLM) may also be referred to as a Fabry-Perot spatial light modulator (FP-SLM).

In various embodiments, the first electrode and/or the second electrode may be transmissive or reflective. In various embodiments, the first electrode may include an electrically conductive material such as indium tin oxide (ITO), gallium doped ITO, fluorine doped tin oxide (FTO), aluminum doped zinc oxide (AZO), or other transparent conducting oxides (TCO). In various other embodiments, the first electrode may include an electrically conductive material such as carbon nanotubes (CNT), nanowire meshes or graphene. The first electrode may be configured to allow at least some electromagnetic waves or optical light to pass through.

In various embodiments, the second electrode may include an electrically conductive material, e.g. a metal such as aluminum (Al), gold (Au), copper (Cu), or silver (Ag).

In various embodiments, the distributed Bragg reflector (DBR) may include a first plurality of layers of a first refractive index alternatively arranged with a second plurality of layers of a second refractive index different from the first refractive index. One layer of the first plurality of layers may be on one layer of the second plurality of layers, while another layer of the first plurality of layers may be on the one layer of the second plurality of layers.

In various embodiments, the first plurality of layers may include a high index material. A real part of the first refractive index may be greater than 2.

In various embodiments, the second plurality of layers may include a low index material. A real part of the second refractive index may be smaller than 2.

In various embodiments, the first plurality of layers and the second plurality of layers may include transparent dielectrics. In various embodiments, an imaginary part of the first refractive index may be smaller than 0.1. In various embodiments, an imaginary part of the second refractive index may be smaller than 0.1.

In various embodiments, the first plurality of layers of the first refractive index may include titanium dioxide ($TiO_2$). In various other embodiments, the first plurality of layers of the first refractive index may include zinc oxide (ZnO), zinc sulfide (ZnS), copper (I) oxide ($Cu_2O$), silicon nitride ($Si_3N_4$), hafnium oxide ($HfO_2$), or any other suitable material with refractive index ≥2 and transparent in the spectral range of interest. In various embodiments, the second plurality of layers of the second refractive index may include silicon dioxide ($SiO_2$), aluminum oxide ($Al_2O_3$), magnesium oxide (MgO), glasses such as fused silica or soda lime glass, or any other suitable material with refractive index<2, and transparent in the spectral range of interest.

In various embodiments, a distributed Bragg reflector (DBR) as described herein may include different portions or blocks, each portion or block optimized for a different wavelength. Each contiguous portion or block may include one or more layers of the first plurality of layers and one or more layers of the second plurality of layers.

In various embodiments, the distributed Bragg reflector (DBR) may have two different portions or blocks. In various embodiments, each layer of the first plurality of layers in a first portion or block of the distributed Bragg reflector (DBR) may have a first thickness. Each layer of the first plurality of layers in a second portion or block of the distributed Bragg reflector (DBR) may have a second thickness different from the first thickness. In various embodiments, each layer of the second plurality of layers in a first portion of the distributed Bragg reflector (DBR) may have a third thickness. Each layer of the second plurality of layers in a second portion of the distributed Bragg reflector (DBR) may have a fourth thickness different from the third thickness.

In various other embodiments, the distributed Bragg reflector (DBR) may have three or more different portions or blocks. In various embodiments, the DBR may have three portions or block. The first portion or block may be optimized for a wavelength in the red (R) region of the electromagnetic spectrum, the second portion or block may be optimized for a wavelength in the green (G) region of the electromagnetic spectrum, and the third portion or block may be optimized for a wavelength in the blue (B) region of the electromagnetic spectrum. Various embodiments may achieve efficient phase modulation at three or more wavelengths.

In various embodiments, a thickness of the liquid crystal (LC) layer 106 may be of any value less than 1 μm. The thickness of the liquid crystal (LC) layer 106 may be thinner than conventional devices, which may significantly reduce the response time of the device, as well as the interpixel cross talk.

In various embodiments, the spatial light modulator may be configured to exhibit multiple resonances upon receiving incident light. The spatial light modulator may be configured such that frequencies of the multiple resonances shift upon varying a voltage difference applied between the first electrode and the second electrode.

In various embodiments, the first reflector may include the distributed Bragg reflector (DBR). In one example, the first electrode may be between the distributed Bragg reflector and the liquid crystal layer 106. In another example, the distributed Bragg reflector may be between the first electrode and the liquid crystal layer.

In various embodiments, the first reflector may include the distributed Bragg reflector (DBR) and the first electrode. In various embodiments, the second reflector may consist only of the second electrode. The second reflector may not include a DBR.

In various embodiments, the second reflector may include one or more further second electrodes so that the second electrode and the one or more further second electrodes form a plurality of second electrodes. Liquid crystals included in different portions of the liquid crystal layer 106 may be configured to be oriented differently by applying a common voltage to the first electrode and different voltages to each of the plurality of second electrodes. Each of the plurality of second electrodes may be addressed using integrated circuits.

Figure 2:
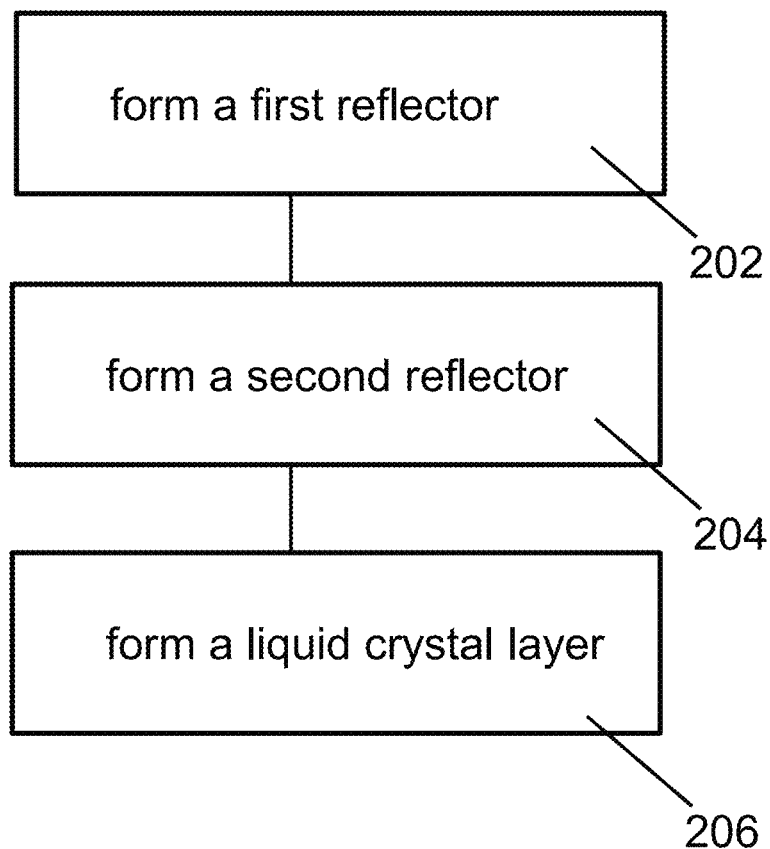
FIG. 2 is a general illustration of a method of forming a spatial light modulator (SLM) according to various embodiments.

FIG. 2 is a general illustration of a method of forming a spatial light modulator (SLM) according to various embodiments. The method may include, in 202, forming a first reflector. The method may include, in 204, forming a second reflector. The method may also include, in 206, forming a liquid crystal layer between the first reflector and the second reflector. The first reflector may include a first electrode. The second reflector may include a second electrode. At least one reflector selected from the first reflector and the second reflector may include or be a distributed Bragg reflector (DBR). The first reflector and the second reflector may form a (FP) Fabry-Perot cavity.

For avoidance of doubt, FIG. 2 is not intended to limit the sequence of the various steps. For instance, step 202 may be before, after, or at the same time as step 204. Step 204 may be before, after or at the same time as step 206.

In various embodiments, the distributed Bragg reflector may include a first plurality of layers of a first refractive index alternatively arranged with a second plurality of layers of a second refractive index different from the first refractive index.

In various embodiments, a distributed Bragg reflector (DBR) as described herein may include different portions or blocks, each portion or block optimized for a different wavelength. Each contiguous portion or block may include one or more layers of the first plurality of layers and one or more layers of the second plurality of layers.

In various embodiments, the distributed Bragg reflector (DBR) may have two different portions or blocks. In various embodiments, each layer of the first plurality of layers in a first portion or block of the distributed Bragg reflector (DBR) may have a first thickness. Each layer of the first plurality of layers in a second portion or block of the distributed Bragg reflector (DBR) may have a second thickness different from the first thickness. In various embodiments, each layer of the second plurality of layers in a first portion of the distributed Bragg reflector (DBR) may have a third thickness. Each layer of the second plurality of layers in a second portion of the distributed Bragg reflector (DBR) may have a fourth thickness different from the third thickness.

In various other embodiments, the distributed Bragg reflector (DBR) may have three or more different portions or blocks.

In various embodiments, the spatial light modulator may be configured to exhibit multiple resonances upon receiving incident light. The spatial light modulator may be configured such that frequencies of the multiple resonances shift upon varying a voltage difference applied between the first electrode and the second electrode.

In various embodiments, the second reflector may include one or more further second electrodes so that the second electrode and the one or more further second electrodes form a plurality of second electrodes.

In various embodiments, liquid crystals included in different portions of the liquid crystal layer may be oriented differently by applying a common voltage to the first electrode and different voltages to each of the plurality of second electrodes.

Various embodiments may relate to a method of operating a spatial light modulator (SLM). The spatial light modulator may be configured to exhibit multiple resonances upon receiving incident light. The method may include providing the light to the spatial light modulator. The method may include varying a voltage difference applied between the first electrode and the second electrode spatial light modulator to shift frequencies of the multiple resonances. In various embodiments, at least some of the multiple resonances may coincide with operational wavelengths of the spatial light modulator, i.e. the wavelengths of the light provided to the spatial light modulator. In various embodiments, the DBRs may be configured such that the spatial light modulator exhibits high reflectivity at the operational frequencies for all orientations of the liquid crystals. For instance, the reflectivity may be >40%, or >60% etc.

In various embodiments, the second reflector may include one or more further second electrodes so that the second electrode and the one or more further second electrodes form a plurality of second electrodes. The method may include applying a common voltage to the first electrode and applying different voltages to each of the plurality of second electrode electrodes.

Various embodiments may relate to an Fabry Perot cavity based SLM device, wherein the thin liquid crystal (LC) layer is tuned to achieve high reflectance and near 2n phase shifts at multiple wavelengths simultaneously. The Fabry Perot spatial light modulator may be able to achieve high reflectance and phase shifts (=2a) at three targeted wavelengths in the primary color region (RGB). The LC layer thickness in the device may be of a value less than 1 μm, which is thinner than conventional available devices.

This may help to significantly reduce the response time of the device, as well as the interpixel cross talk. The latter may allow the pixel pitch of the device presented here to be very small (<1 μm), which may help to reduce the system size and to impart a wide field of view (FOV). Moreover, various embodiments may be used to achieve efficient beam bending at different wavelengths, which may find applications in Light Detection and Ranging (LIDAR).

Various embodiments may relate to a Liquid Crystal on Silicon spatial light modulator (LCoS SLM) based on Fabry Perot cavity resonances. The spatial light modulator may achieve high phase modulation and reflectance with a very thin (wavelength-scale) LC cell, which allows for shrinking the pixel size down to the wavelength or sub-wavelength dimensions, thus increasing the resolution, field of view (FOV) and response speed while still be able to simultaneously operate at multiple discreet wavelengths within the visible spectrum.

In various embodiments, the targeted wavelengths of the device may pertain to the three primary colors in the visible spectrum, i.e. red (R), green (G) and blue (B) at wavelengths $\lambda_R$=645 μm, $\lambda_G$=532 μm and $\lambda_B$=465 μm, respectively. The associated phase modulation achieved at the wavelengths of interest may be 1.88 π (645 nm), 1.96 π (532 nm), and 1.96 π (465 nm), which are close to the full range of 2π. The associated reflectance at these targeted wavelengths may be: >46% (for 645 nm), >66% (for 532 nm) and >60% (for 465 nm).

Various embodiments may include two partially reflecting mirrors, in the form of dielectric DBR stacks forming the FP cavity. Each of the DBR may be made of alternating layers of dielectric materials with different refractive indices, e.g. titanium dioxide ($TiO_2$) and silicon dioxide ($SiO_2$), where the thickness of each layer (and/or pair of layers) and the number of pairs are designed (and optimized) to achieve the desired results.

The cavity between the DBR stacks may be filled with a uniaxial nematic LC presenting birefringence. The birefringence Δn may be defined as:

$$\Delta n = n_e - n_o \quad (1)$$

where $n_e$ is the extraordinary refractive index (i.e. the refractive index experienced by optical light when its electric field is polarized along the LC director) and $n_o$ is the ordinary refractive index (i.e. the refractive index experienced by light when its electric field is polarized perpendicular to the LC director).

In various embodiments, the birefringence may be taken as Δn≈0.2 ($n_e$≈1.74 and $n_o$≈1.52), corresponding to the values of a commercial liquid crystal (E7 by Merck®). In various embodiments, the spatial light modulator may include a layer of indium tin oxide (ITO) on top of the upper distributed Bragg reflector (DBR), and a pixelated metal (aluminum) layer at the bottom of the lower distributed Bragg reflector (DBR). The ITO and Al layers may act as electrodes for the device and may allow reorienting of the LC molecules in the liquid crystal layer by application of external voltages (electric field) across the ITO and Al layers. In various other embodiments, the ITO layer may be placed at the bottom of the upper DBR, i.e. between the upper DBR and the liquid crystal layer. Also, in yet various other embodiments, instead of a lower DBR, the metal electrodes may be simply used as reflectors or mirrors for the cavity. However, the user of metal electrodes may result in lower reflectivity of the device. Upon application of a potential difference between the top electrode and the bottom electrode, the orientation angle of LC molecules may be tuned from 90° (the LC director being parallel to the surface of the bottom electrode or top electrode and being parallel to the polarization of the electric field of the incident light, referred to as in-plane orientation) to 0° (the LC director being perpendicular to the surface of the bottom electrode or the top electrode and being perpendicular to the polarization of the electric field of the incident light, referred to as out-of-plane orientation). As a consequence of this reorientation, the multiple resonances of the FP cavity may be spectrally tuned, resulting in amplitude and phase modulation of the light reflected from the spatial light modulator.

Various embodiments may be used for different possible applications, such as for beam steering, e.g. in LIDAR applications. The simulated results show that efficient beam bending can be achieved at all the targeted wavelengths (465, 532 and 645 nm). Beam bending efficiencies obtained at these wavelengths may range from 50% to 70% for a pixel size as small as 550 nm.

Various embodiments with its thin LC cell thickness (e.g. 750 nm, in some embodiments) and small pixel size (e.g. 550 nm in some embodiments) may serve as a compact LCoS SLM device simultaneously working at all three RGB wavelengths. Various embodiments may have an advantage over other commercially available LCoS devices. Various embodiments may have a thin LC cell, which may result in faster response time and small pixel size, which in turn gives higher FOV. Various embodiments may have advantages over nanoantenna based SLMs, in that various embodiments may be able to operate at multiple wavelengths while having a comparably small pixel size. Various embodiments may have applications in three dimensional (3D) displays, two or three dimensional (2D/3D) dynamic holographic and augmented reality/virtual reality (AR/VR) displays, as well as in LIDAR.

Various embodiments may relate to a multispectral SLM device based on Fabry Perot resonances (i.e. FP-SLM). The device may include an LC layer embedded between two partially reflecting mirrors, which give rise to multiple, spectrally separated, resonances in the cavity. The resonances may be tuned by switching the orientation of the LC molecules upon application of a potential difference or voltage across the LC layer.

Figure 3:
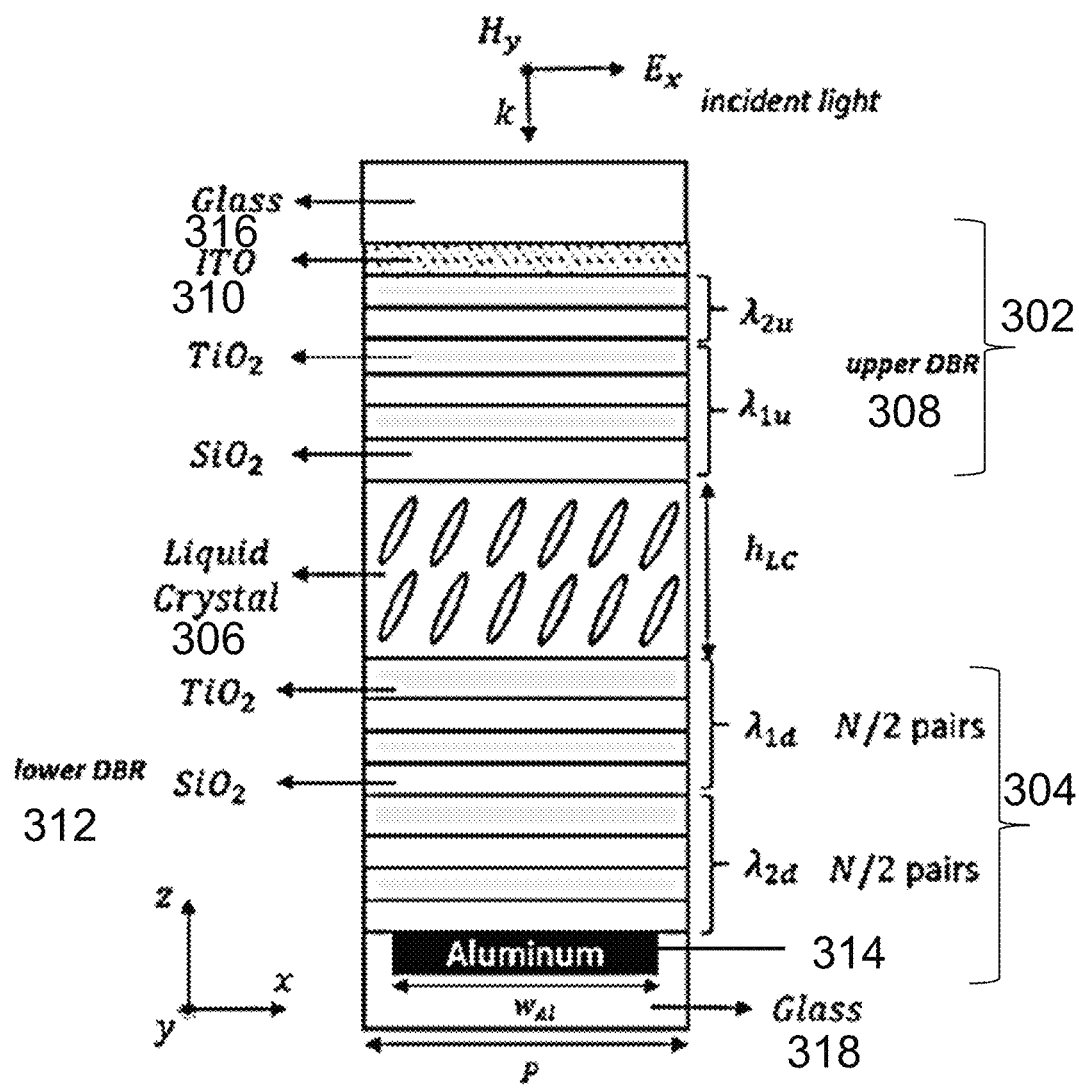
FIG. 3 is a schematic showing a cross-sectional side view of a unit-cell of a spatial light modulator (SLM) according to various embodiments.

FIG. 3 is a schematic showing a cross-sectional side view of a unit-cell of a spatial light modulator (SLM) according to various embodiments. The full device may include a plurality of unit-cells or pixels. The full device may be formed by periodic repetition of the unit-cell or pixel as shown in in FIG. 3, and may either be in a two dimensional (2D) array or a one dimensional (1D) array. The spatial light modulator may include a first reflector 302, a second reflector 304, and a liquid crystal (LC) layer 306 between the first reflector 302 and the second reflector 304. The first reflector 302 may include an upper distributed Bragg reflector 308 and a first electrode 310, e.g. a continuous, thin, transparent indium tin oxide (ITO) electrode. The second reflector 304 may include a lower Bragg reflector 312 and second electrodes 314, e.g. a discontinuous aluminum (Al) layer. The full device may include a plurality of second electrodes 314, each second electrode being a metal patch which defines a device pixel. The liquid crystal layer 306 may include birefringent LC (e.g. ordinary refractive index of about 1.52, extraordinary refractive index of 1.74). The unit-cell may include a cavity formed by partially reflecting reflectors (e.g. DBRs 308, 312) and the liquid crystal layer 306. The ITO layer 310 may act as a common electrode, while the aluminum layer 314 may act as pixelated bottom electrodes. By applying a potential difference or a voltage between the ITO layer 310 and a bottom electrode 314, the portion of the liquid crystal layer 306 between them may be switched.

The entire device may be sandwiched between the superstrate 316 and the substrate 318, which may include glass or any other transparent, low refractive index material. In various embodiments, the spatial light modulator may include one or more additional layers which act as an antireflective (AR) coating, reducing or minimizing the reflection from the first glass interface at the operating wavelengths of interest.

Each of the upper DBR 308 and the lower DBR 312 may include or consist of alternating layers of high refractive index transparent dielectric material and low refractive index transparent dielectric material. A material may be referred to as a low index material if the real part of its refractive index at the operating wavelength is smaller than 2 (this is n<2), and as a high refractive index material if the real part of its refractive index is larger than 2 (this is n>2). A material may be a transparent dielectric material if the imaginary part of the refractive index at the operating wavelength is smaller than 0.1 (this is k<0.1). In various embodiments, each of the upper DBR 308 and the lower DBR 312 may include alternating layers of titanium dioxide or $TiO_2$ (n≈2.48 and k≈0) and silicon dioxide or $SiO_2$ (n=1.46 and k≈0).

The thicknesses of the layers included in the DBRs 308, 312 may be proportional to a particular wavelength λ at which the given layer is optimized. For instance, if a layer is optimized at wavelength λ, then its thickness $t_{layer}$ may be given as:

$$t_{layer} \sim \lambda/(4n_{layer}) \qquad (2)$$

where $n_{layer}$ is the refractive index of the layer.

In various embodiments, the layers in the upper DBR 308 may be optimized at wavelengths $\lambda_{1u}$ and $\lambda_{2u}$. Similarly, the layers in the lower DBR 312 may be optimized at wavelengths $\lambda_{1d}$ and $\lambda_{2d}$.

In various embodiments, the lower DBR 312 may include or consist of N pairs of $TiO_2/SiO_2$ layers, of which the half of the pairs (N/2) are optimized at kid, and the other half (N/2), at $\lambda_{2d}$. Similarly, the upper DBR 308 may include or consist of N pairs of $TiO_2/SiO_2$ layers, of which the half of the pairs (N/2) are optimized at $\lambda_{1u}$, and the other half (N/2), at $\lambda_{2u}$.

The full device may be obtained by repeating the unit-cell shown in FIG. 3 in the x and y directions, with periodicity P, where $P_x$ is the periodicity in the x direction, and $P_y$ is the periodicity in the y direction. The width of the metal (Al) patch acting as the bottom pixelated electrode 314 may be set to $w_{Al}$=500 nm, and the thickness may be set to $t_{Al}$=200 nm. The distance between the lower and upper DBR may be fixed at $h_{LC}$=750 nm. The space between the two DBR 308, 312 may be filled with LC. The thickness of the LC layer 306 may coincide with the distance $h_{LC}$.

The LC in the device may be electrically switched by applying a potential difference or voltage across the two electrodes 310, 314.

Figure 4:
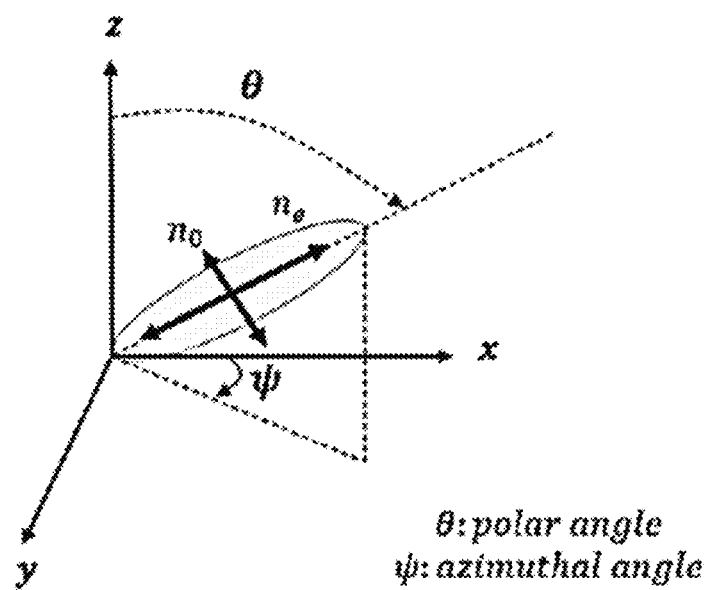
FIG. 4 is a schematic of a liquid crystal molecule used in the spatial light modulator according to various embodiments.

FIG. 4 is a schematic of a liquid crystal molecule used in the spatial light modulator according to various embodiments. The long axis of the LC molecules may be referred to as the LC director. The refractive indices of the LC for incident light polarization along and perpendicular to the LC director may be called the extraordinary refractive index ($n_e$) and the ordinary refractive index ($n_o$), respectively. One may also define the anisotropic index of the refraction of the LC by specifying the LC director orientation with respect to a coordinate axis. This orientation may be provided given by two parameters: (a) the polar angle (θ); and (b) the azimuthal angle (φ), as shown in FIG. 4. The angle θ may be tuned by applying the required voltages between the two electrodes, while the azimuthal angle may usually be fixed using some LC alignment techniques, such as photoalignment or rubbing. In various embodiments as described below, the azimuthal angle may be fixed at φ=0°, while the polar angle θ can vary from 0° to 90°. The polar angle may also be represented by $\theta_{LC}$.

Figure 5:
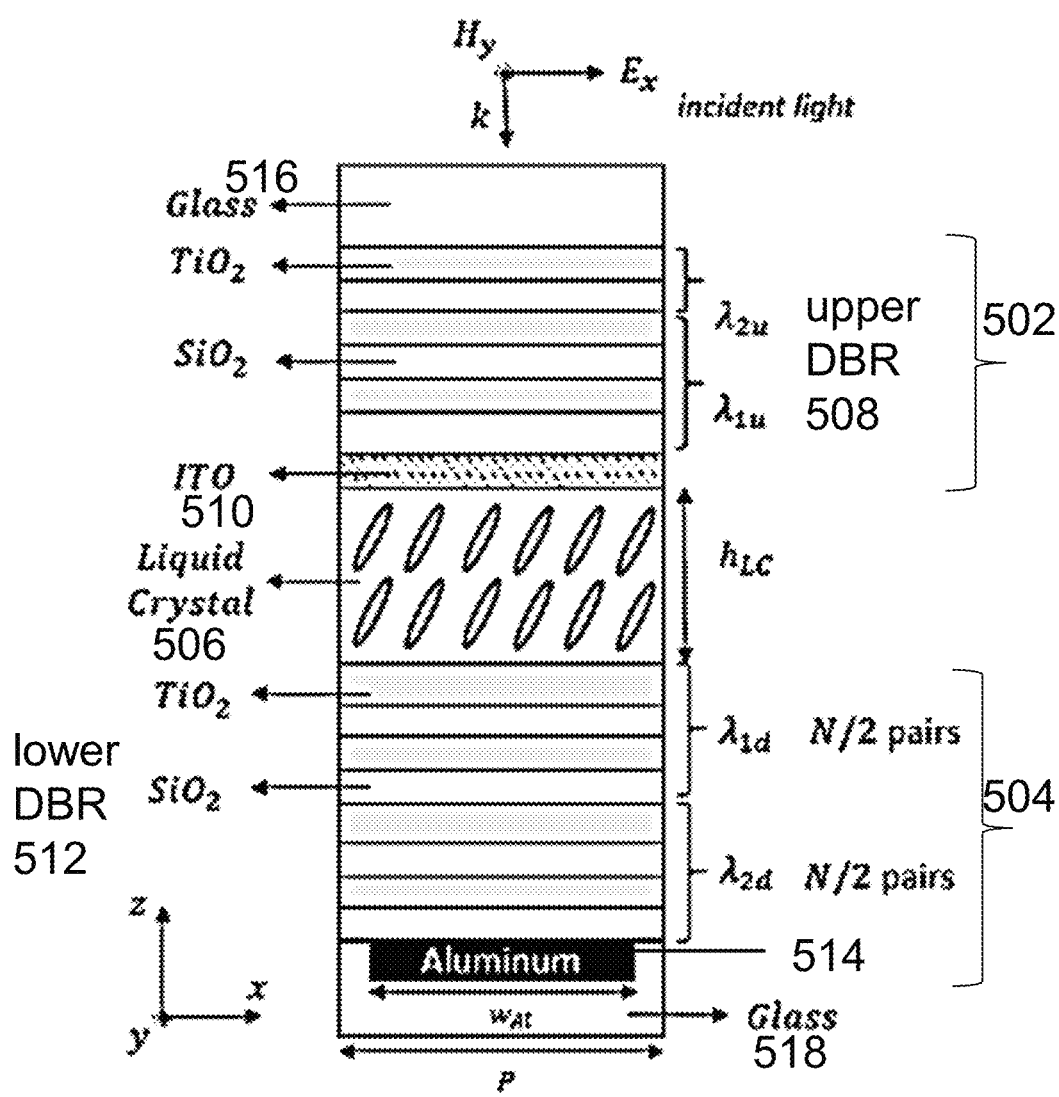
FIG. 5 is a schematic showing a cross-sectional side view of a unit-cell of a spatial light modulator (SLM) according to various other embodiments.

FIG. 5 is a schematic showing a cross-sectional side view of a unit-cell of a spatial light modulator (SLM) according to various other embodiments. The spatial light modulator may include a first reflector 502, a second reflector 504, and a liquid crystal (LC) layer 506 between the first reflector 502 and the second reflector 504. The first reflector 502 may include an upper distributed Bragg reflector 508 and a first electrode 510, e.g. a continuous, thin, transparent indium tin oxide (ITO) electrode. The second reflector 504 may include a lower Bragg reflector 512 and second electrodes 514, e.g. a discontinuous aluminum (Al) layer. The spatial light modulator may further include superstrate 516 and substrate 518. As shown in FIG. 5, first electrode 510 may be between the liquid crystal layer 506 and the upper DBR 508.

Figure 6:
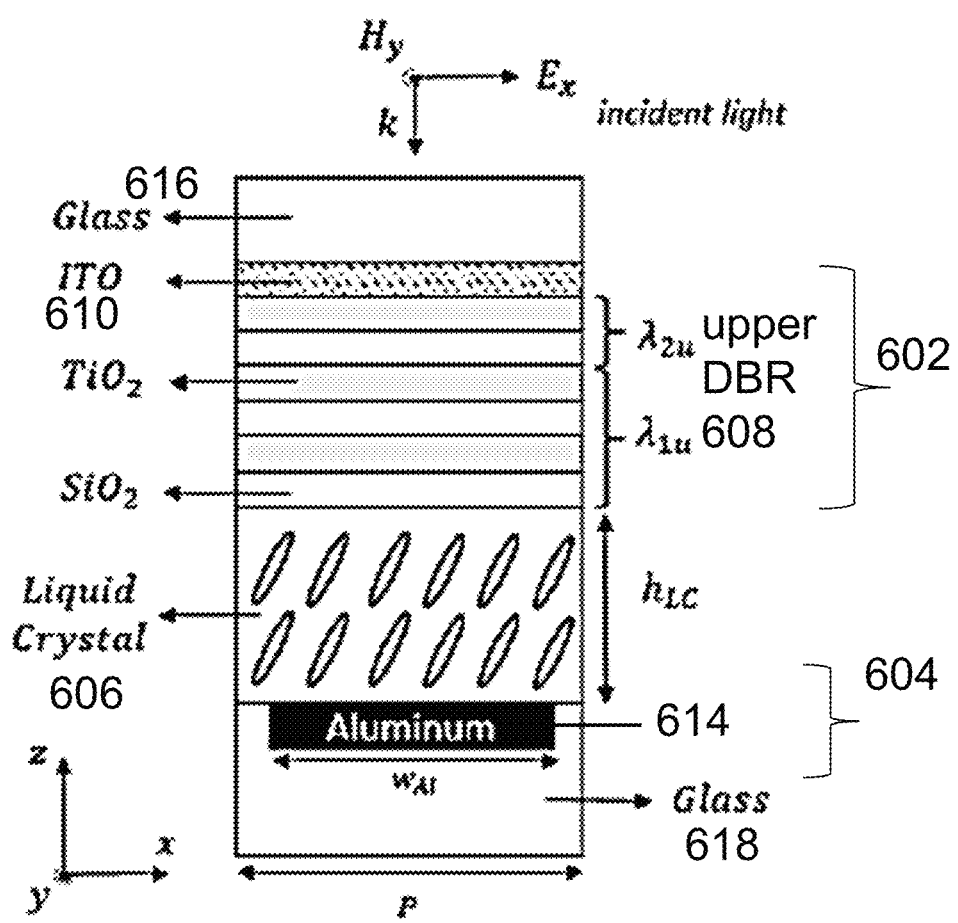
FIG. 6 is a schematic showing a cross-sectional side view of a unit-cell of a spatial light modulator (SLM) according to yet various other embodiments.

FIG. 6 is a schematic showing a cross-sectional side view of a unit-cell of a spatial light modulator (SLM) according to yet various other embodiments. The spatial light modulator may include a first reflector 602, a second reflector 604, and a liquid crystal (LC) layer 606 between the first reflector 602 and the second reflector 604. The first reflector 602 may include an upper distributed Bragg reflector 608 and a first electrode 610, e.g. a continuous, thin, transparent indium tin oxide (ITO) electrode. The second reflector 604 may consist of a discontinuous aluminum (Al) layer 614, which act as electrodes and may also reflect light. The spatial light modulator as shown in FIG. 6 may not include a lower DBR, and the liquid crystal layer 606 may be on the aluminum (Al) layer 614. The spatial light modulator may further include superstrate 616 and substrate 618.

The spatial light modulator shown in FIG. 3 may have the advantage of having high reflectivity compared to the modulators as shown in FIGS. 5-6, as a result of the liquid crystal layer directly in contact with either the ITO layer (FIG. 5) or the aluminum (Al) layer (FIG. 6).

Distributed Bragg reflectors (DBRs) may include alternate layers of materials with different dielectric constants. These structures may possess stopbands in which electromagnetic waves or light of a particular wavelength range is not allowed to pass through the structure. In other words, the light at these wavelengths may be reflected (partially or completely) back from the DBR structure. In various embodiments as described herein, the DBRs may play an important role in forming the Fabry Perot (FP) cavity and in determining its multispectral resonances, which may then be further tuned by switching the orientation of the LC in the liquid crystal layer. Various embodiments may relate to a method to achieve high reflectance and phase modulation from the FP cavity at multiple wavelengths, with the focus on wavelengths in the visible region of the spectrum and, in particular, at the primary colors corresponding to blue, green and red. Various embodiments may relate to designing DBRs in such a manner that they give high reflectance as well as high phase change at these wavelengths.

The design of the device was carried out by full wave numerical simulations based on Finite Difference Time Domain method (FDTD, Lumerical Solutions). In all the simulations of the design(s) as mentioned henceforth a plane wave source is incident (from z-direction) from the topmost layer. The periodic boundary condition is applied on the boundaries perpendicular to the direction of the propagation of light (i.e. x and y). Two perfectly matched layer (PML) layers are then placed in z-direction, one at a distance away from the top layer of the DBR (just above the glass), and other at the bottom of the device. The incident light travels through the device, is reflected back, and is transmitted through different layers. The reflected light is collected by a monitor (plane monitor) placed in the topmost layer of the device. The reflected phase is then calculated by averaging over the phase of the electric fields recorded at the monitor.

Figure 7A:
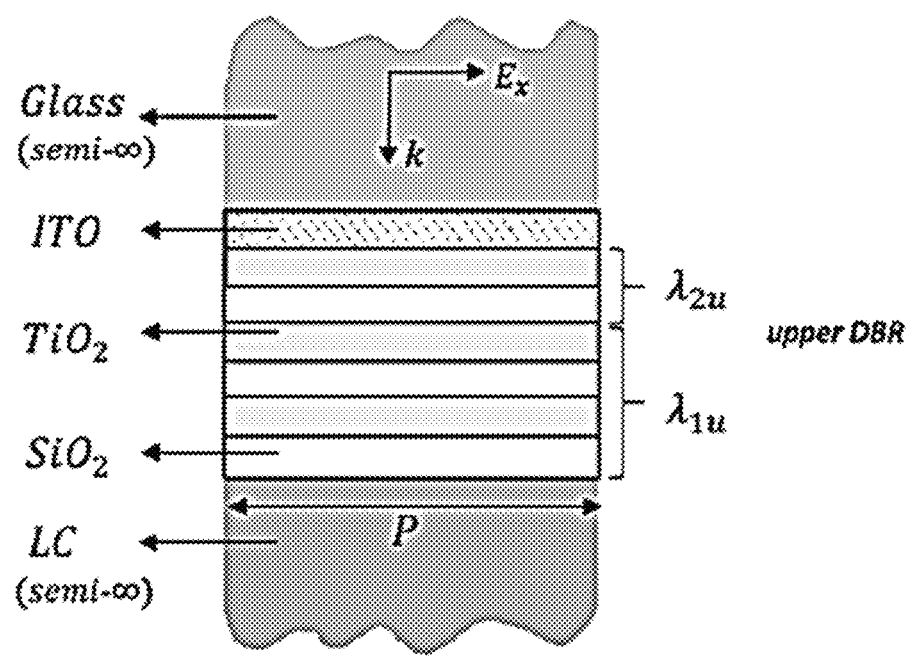
FIG. 7A is a schematic illustrating the design of the upper distributed Bragg reflector (DBR) of a spatial light modulator according to various embodiments to achieve high reflectance in the targeted wavelength regions.

FIG. 7A is a schematic illustrating the design of the upper distributed Bragg reflector (DBR) of a spatial light modulator according to various embodiments to achieve high reflectance in the targeted wavelength regions. The design of the upper DBR may need to take into account the thin layer of ITO (taken here to be 23 nm) on top of it (or at the bottom of it). The ITO layer may act as the common top electrode in the FP-SLM. The superstrate may then be considered to be a semi-infinite layer of glass (n=1.46). A semi-infinite layer of LC on the bottom may also be considered. This setup mimics the upper part of the FP-SLM unit-cell shown in FIG. 3. The first pair of $TiO_2/SiO_2$ layers is configured to reflect light at the optimized wavelength $\lambda_{2u}$=580 nm. For the purpose of calculation of the thickness of the dielectric layers, the refractive index constants of $TiO_2$ and $SiO_2$ at the wavelength of interest are taken as $n_{TiO2}$=2.48 and $n_{SiO2}$=1.46 respectively. Therefore, at $\lambda_{2u}$, the thickness of the $TiO_2$ layer should be $\lambda_{2u}/(4\ n_{TiO2})$, and the thickness of the $SiO_2$ layer should be $A_{2u}/(4\ n_{SiO2})$.

Similarly, the other two pairs of $TiO_2/SiO_2$ layers are then set to reflect light at the other wavelength of interest $\lambda_{1u}$. Thus, the $TiO_2$ layers each has a thickness of $\lambda_{1u}/(4\ n_{TiO2})$, and the $SiO_2$ layers each as a thickness of $\lambda_{1u}/(4\ n_{SiO2})$, where $\lambda_{1u}$=500 nm. The entire modulator is then assumed to be periodic in x and y direction with periodicity P.

Figure 7B:
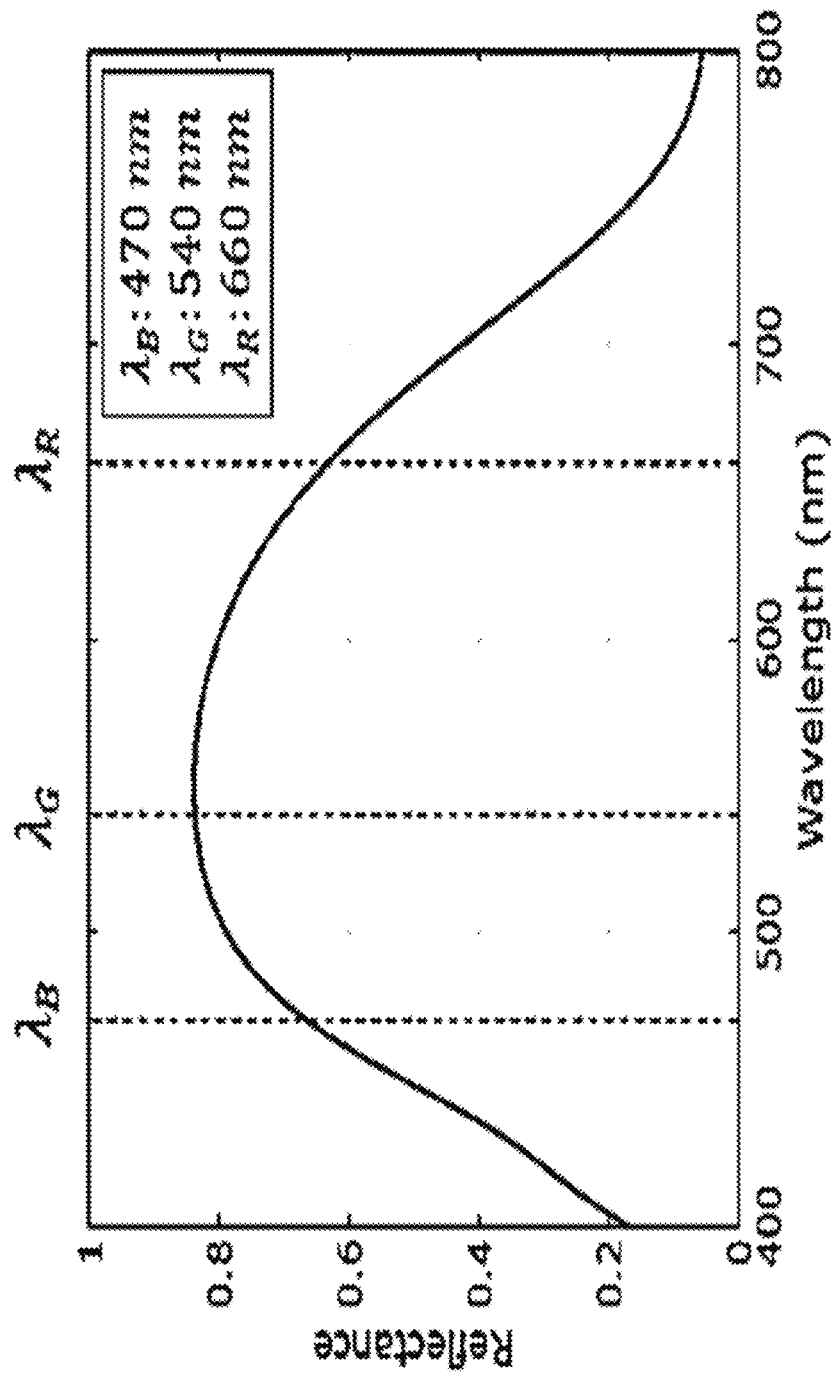
FIG. 7B is a plot of reflectance as a function of wavelength (in nanometers or nm) illustrating the simulated reflectance of the upper distributed Bragg reflector (DBR) shown in FIG. 7A according to various embodiments.

FIG. 7B is a plot of reflectance as a function of wavelength (in nanometers or nm) illustrating the simulated reflectance of the upper distributed Bragg reflector (DBR) shown in FIG. 7A according to various embodiments. FIG. 7B shows that the upper DBR has high reflectance across blue, green and red regions of the visible spectrum, i.e. across the wavelengths of interest. The maximum reflectance value possible is 1, representing perfect reflectance of incident light. The simulated reflectance spectrum is above 60% relative to the maximum reflectance value for the wavelengths of interest in the blue region ($\lambda_B$=465 nm), the green region ($\lambda_G$=532 nm), and the red region ($\lambda_R$=645 nm) (as indicated by the dashed lines in FIG. 7B).

Figure 8A:
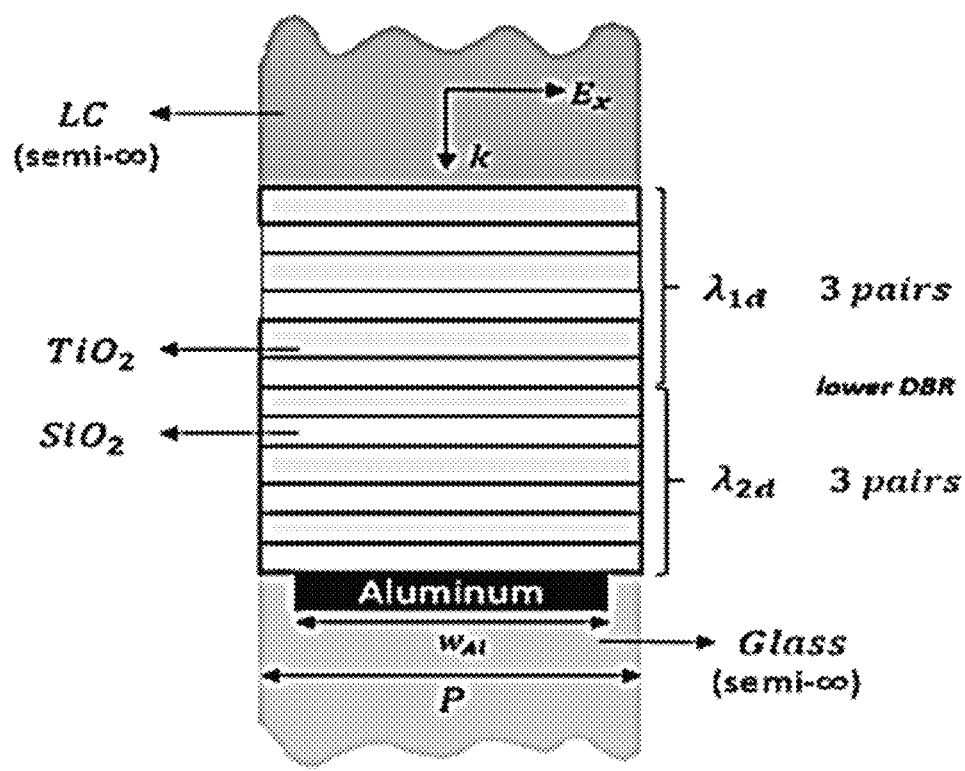
FIG. 8A is a schematic illustrating the design of the lower distributed Bragg reflector (DBR) of the spatial light modulator according to various embodiments to achieve high reflectance in the targeted wavelength regions.

The lower distributed Bragg reflector (DBR) may also be designed to achieve a high reflectance over the range of wavelengths of interest. FIG. 8A is a schematic illustrating the design of the lower distributed Bragg reflector (DBR) of the spatial light modulator according to various embodiments to achieve high reflectance in the targeted wavelength regions. The DBR shown in FIG. 8A includes 6 pairs of $TiO_2/SiO_2$ layers, of which 3 pairs are designed to provide high reflectivity at the first targeted wavelength $\Delta_{1d}$=450 nm, and the remaining 3 pairs are designed to provide high reflectivity at the second targeted wavelength $\Delta_{2d}$=530 nm. Six pairs of $TiO_2/SiO_2$ are selected here, as this combination may provide high reflectance across the whole wavelength range of interest, namely in the RGB (Red, Green, Blue) regions. The lower DBR may need to be designed taking into account the pixelated metal (Al) electrode, along with a semi-infinite glass (which plays the role of the substrate in the FP-SLM) below the pixelated metal electrode and a semi-infinite layer of LC on top of the electrode. The structure is periodic in x and y directions with periodicity P. This setup then mimics the lower portion of the FP-SLM pixel (shown in FIG. 3).

Figure 8B:
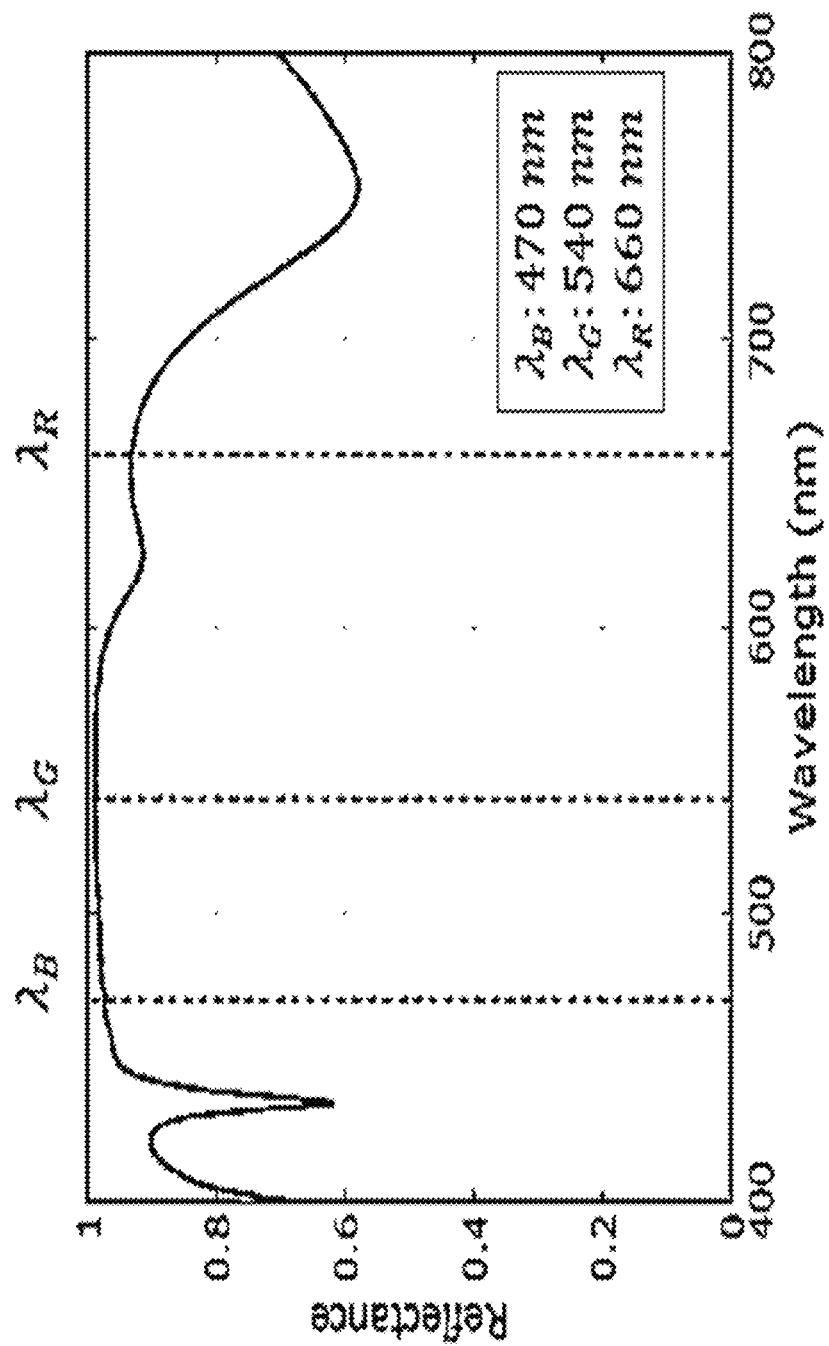
FIG. 8B is a plot of reflectance as a function of wavelength (in nanometers or nm) illustrating the simulated reflectance of the lower distributed Bragg reflector (DBR) shown in FIG. 8A according to various embodiments.

FIG. 8B is a plot of reflectance as a function of wavelength (in nanometers or nm) illustrating the simulated reflectance of the lower distributed Bragg reflector (DBR) shown in FIG. 8A according to various embodiments. It may be noted from FIG. 8B, that in the RGB region, >90% reflectance is obtained at $\lambda_B$, $\lambda_G$ and $\lambda_R$. The reflectance in FIG. 7B and FIG. 8B are calculated by setting the refractive index of LC to $n_e$=1.74 (corresponding to LC orientation, i.e. $\theta_{LC}$=90°). The reflectance at other orientations of LC may almost be similar to the one obtained by using extraordinary refractive index.

During operation, x-polarized light may be incident onto the top glass surface of spatial light modulator unit-cell shown in FIG. 3. Upon interacting with the unit-cell, the light may be reflected back or absorbed. The presence of the two partially reflecting mirrors may form a FP cavity that gives rise to a number of sharp resonances in the visible spectrum (identified as dips in the reflectivity or peaks in the absorption). The spectral positions of these resonances may depend on the cavity thickness (taken here to be $h_{LC}$=750 nm), and may be shifted by tuning the refractive index of the LC (i.e. by varying the LC director orientation, determined by the angle $\theta_{LC}$).

Figure 9:
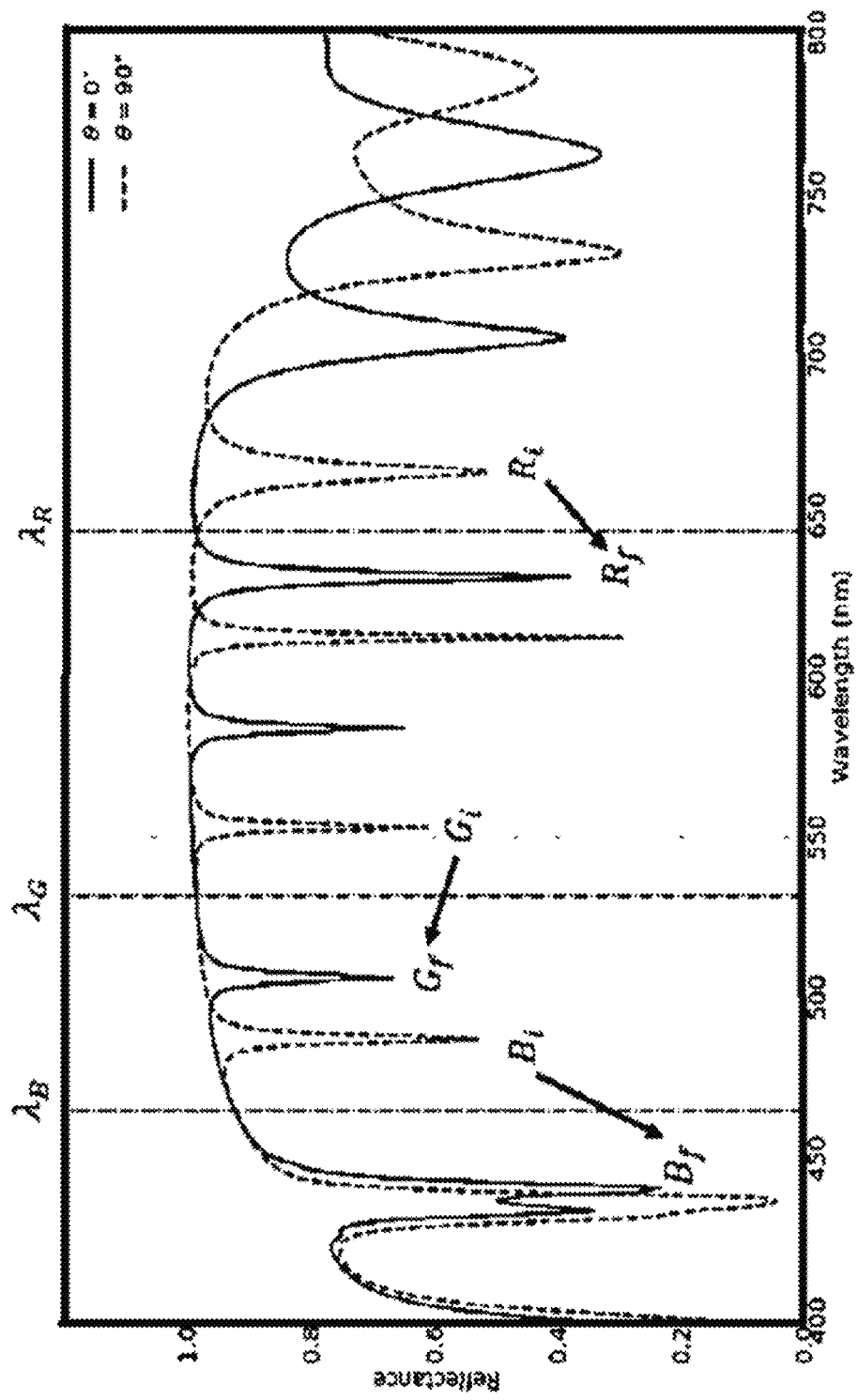
FIG. 9 is a plot of reflectance as a function of wavelengths (in nanometers or nm) showing the simulated reflectance of light from the Fabry-Perot spatial light modulator (FPSLM) according to various embodiments.

FIG. 9 is a plot of reflectance as a function of wavelengths (in nanometers or nm) showing the simulated reflectance of light from the Fabry-Perot spatial light modulator (FPSLM) according to various embodiments. The solid black curve shown in FIG. 9 represents the reflectance obtained when $\theta_{LC}$=0°. Clearly, a number of FP resonances distributed across the whole visible spectrum may be observed when the liquid crystal molecules are in such an orientation. The dashed curve represents the reflectance obtained by setting $\theta_{LC}$=90°. It can be noted that from FIG. 9 that the resonance positions are shifted as compared to the case when $\theta_{LC}$=0°, because of the change of the LC refractive index experienced by the incident wave. In the figure, the vertical dashed lines represent the RGB wavelengths of interest. The wavelengths in which resonances occur are also indicated. The resonances are employed to tune the phase of the reflected wave at these indicated wavelengths. $X_i$ represents the initial position when $\theta_{LC}$=90°, while $\lambda_f$ represents the final position when $\theta_{LC}$=0°; where X may be R (red), G (green) or B (blue)). Resonances at other, intermediate angles of LC director rotation (i.e. 0°<$\theta_{LC}$<90°), lie between the resonance positions of the 0° and 90° states. These resonances are not shown in FIG. 9 for the sake of clarity.

The reflectance of light from the spatial light modulator as well as the phase accumulation upon reflection are subsequently studied at all the wavelengths across the visible region (400 nm-800 nm). As expected, the maximum phase shifts are obtained at the wavelengths of interest, i.e. at $\lambda_B$=465 nm in the blue wavelength region, at $\lambda_G$=532 nm in the green region and at $\lambda_R$=645 nm in the red region.

Figure 10A:
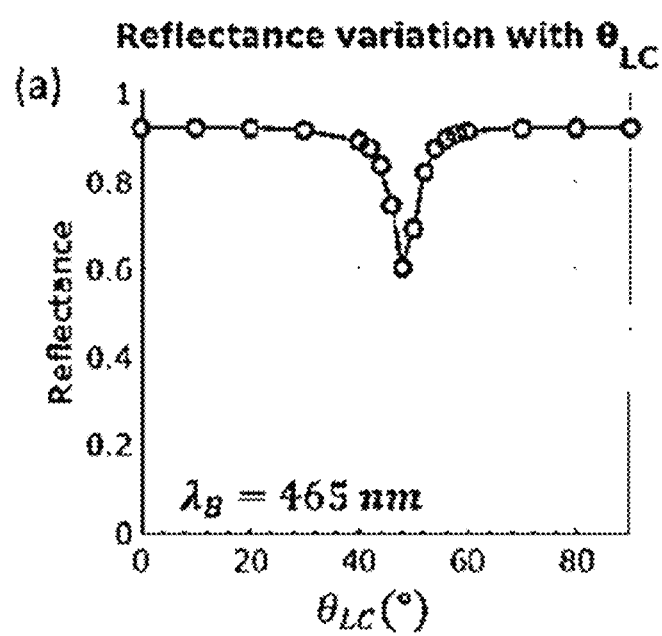
FIG. 10A is a plot of reflectance as a function of the liquid crystal (LC) director orientation angle $\theta_{LC}$ (in degrees or °) showing the variation of reflectance as $\theta_{LC}$ is changed for the spatial light modulator according to various embodiments at a wavelength $\lambda_B$ of 465 nm.
Figure 10B:
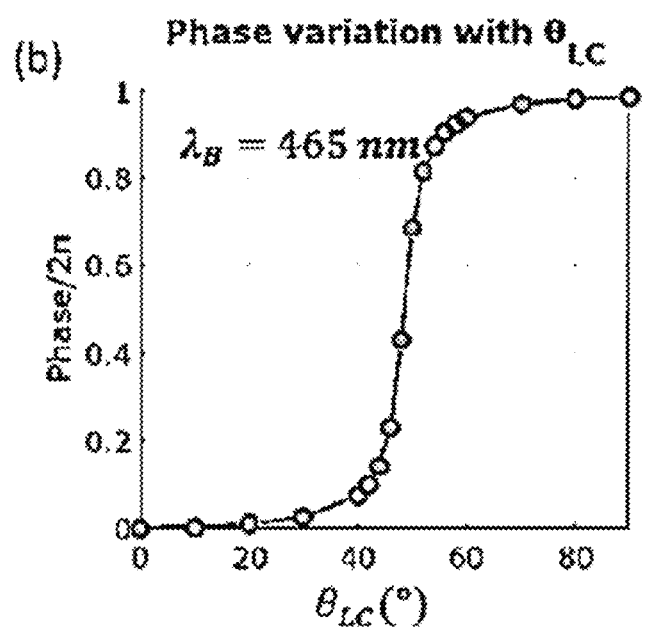
FIG. 10B is a plot of relative phase (with respect to $2\pi$) as a function of the liquid crystal (LC) director orientation angle $\theta_{LC}$ (in degrees or °) showing the variation of relative phase as $\theta_{LC}$ is changed for the spatial light modulator according to various embodiments at a wavelength $\lambda_B$ of 465 nm.

FIGS. 10A-F are plots showing the reflectance and phase shifts for these three wavelengths, as a function of the LC director orientation angle. FIG. 10A is a plot of reflectance as a function of the liquid crystal (LC) director orientation angle $\theta_{LC}$ (in degrees or °) showing the variation of reflectance as $\theta_{LC}$ is changed for the spatial light modulator according to various embodiments at a wavelength $\lambda_B$ of 465 nm. The reflectance is above 60% relative to a maximum reflectance value of 1 at all crystal orientations. FIG. 10B is a plot of relative phase (with respect to 2π) as a function of the liquid crystal (LC) director orientation angle $\theta_{LC}$ (in degrees or °) showing the variation of relative phase as $\theta_{LC}$ is changed for the spatial light modulator according to various embodiments at a wavelength $\lambda_B$ of 465 nm.

Figure 10C:
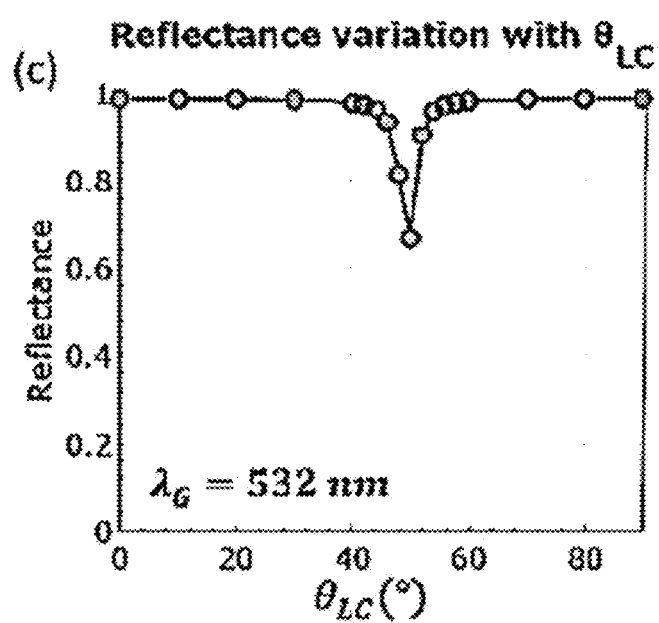
FIG. 10C is a plot of reflectance as a function of the liquid crystal (LC) director orientation angle $\theta_{LC}$ (in degrees or °) showing the variation of reflectance as $\theta_{LC}$ is changed for the spatial light modulator according to various embodiments at a wavelength $\lambda_G$ of 532 nm.
Figure 10D:
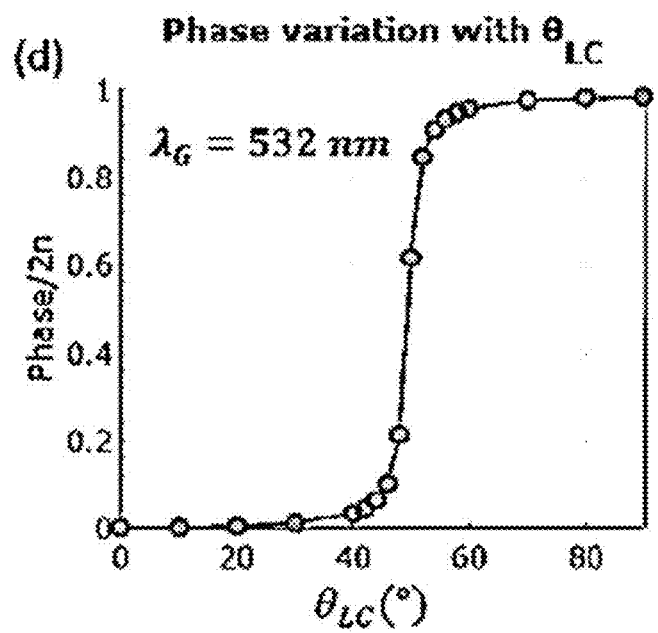
FIG. 10D is a plot of relative phase (with respect to 27E) as a function of the liquid crystal (LC) director orientation angle $\theta_{LC}$ (in degrees or °) showing the variation of relative phase as $\theta_{LC}$ is changed for the spatial light modulator according to various embodiments at a wavelength $\lambda_G$ of 532 nm.

FIG. 10C is a plot of reflectance as a function of the liquid crystal (LC) director orientation angle $\theta_{LC}$ (in degrees or °)

showing the variation of reflectance as $\theta_{LC}$ is changed for the spatial light modulator according to various embodiments at a wavelength $\lambda_0$ of 532 nm. The reflectance is above 66% relative to a maximum reflectance value of 1 at all crystal orientations. FIG. 10D is a plot of relative phase (with respect to 2π) as a function of the liquid crystal (LC) director orientation angle $\theta_{LC}$ (in degrees or °) showing the variation of relative phase as $\theta_{LC}$ is changed for the spatial light modulator according to various embodiments at a wavelength $\lambda_G$ of 532 nm.

Figure 10E:
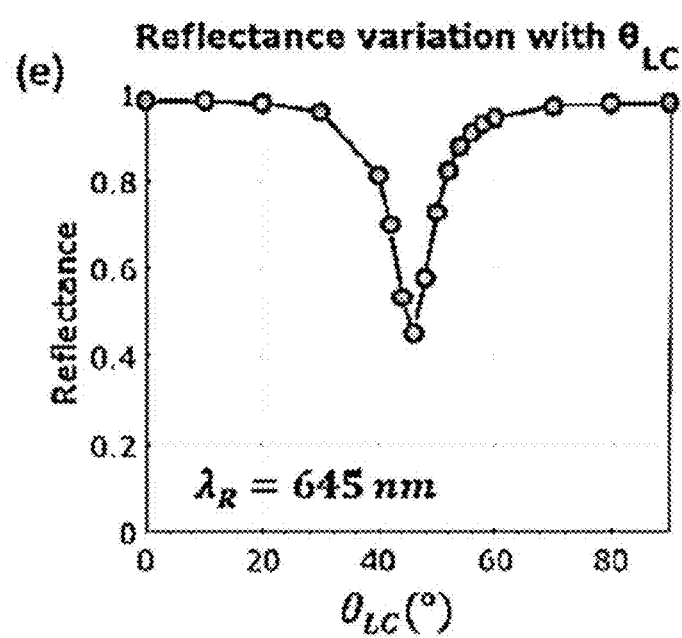
FIG. 10E is a plot of reflectance as a function of the liquid crystal (LC) director orientation angle $\theta_{LC}$ (in degrees or °) showing the variation of reflectance as $\theta_{LC}$ is changed for the spatial light modulator according to various embodiments at a wavelength $\lambda_R$ of 645 nm.
Figure 10F:
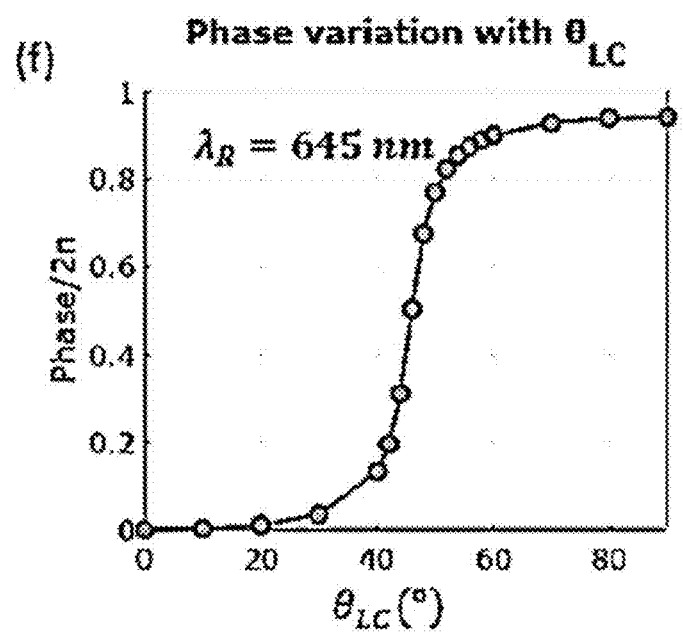
FIG. 10F is a plot of relative phase (with respect to $2\pi$) as a function of the liquid crystal (LC) director orientation angle $\theta_{LC}$ (in degrees or °) showing the variation of relative phase as $\theta_{LC}$ is changed for the spatial light modulator according to various embodiments at a wavelength $\lambda_R$ of 645 nm.

FIG. 10E is a plot of reflectance as a function of the liquid crystal (LC) director orientation angle $\theta_{LC}$ (in degrees or °) showing the variation of reflectance as $\theta_{LC}$ is changed for the spatial light modulator according to various embodiments at a wavelength $\lambda_R$ of 645 nm. The reflectance is above 46% relative to a maximum reflectance value of 1 at all crystal orientations. FIG. 10F is a plot of relative phase (with respect to 2π) as a function of the liquid crystal (LC) director orientation angle $\theta_{LC}$ (in degrees or °) showing the variation of relative phase as $\theta_{LC}$ is changed for the spatial light modulator according to various embodiments at a wavelength $\lambda_R$ of 645 nm.

The maximum phase shift $\Delta\phi$ at a given wavelength, i.e. the phase difference obtained at LC angles 0° and 90° may be provided by $$\Delta\phi = \phi_{90} - \phi_0 \quad (3)$$

where $\phi_{90}$ is the phase obtained when $\theta_{LC}=90°$ (in-plane LC orientation, also parallel to the polarization of the incident electric field) and $\phi_0$ is the phase obtained when $\theta_{LC}=0°$ (out-of-plane LC orientation, also perpendicular to the polarization of the incident electric field and parallel to the incident wave-vector). The maximum phase shifts at the three wavelengths 465 nm, 532 nm and 645 nm are 1.967π, 1.96 π and 1.88π, respectively. Hence, high reflectance and phase shifts (=2π) can be obtained for the wavelengths of interest across the RGB region.

Figure 11:
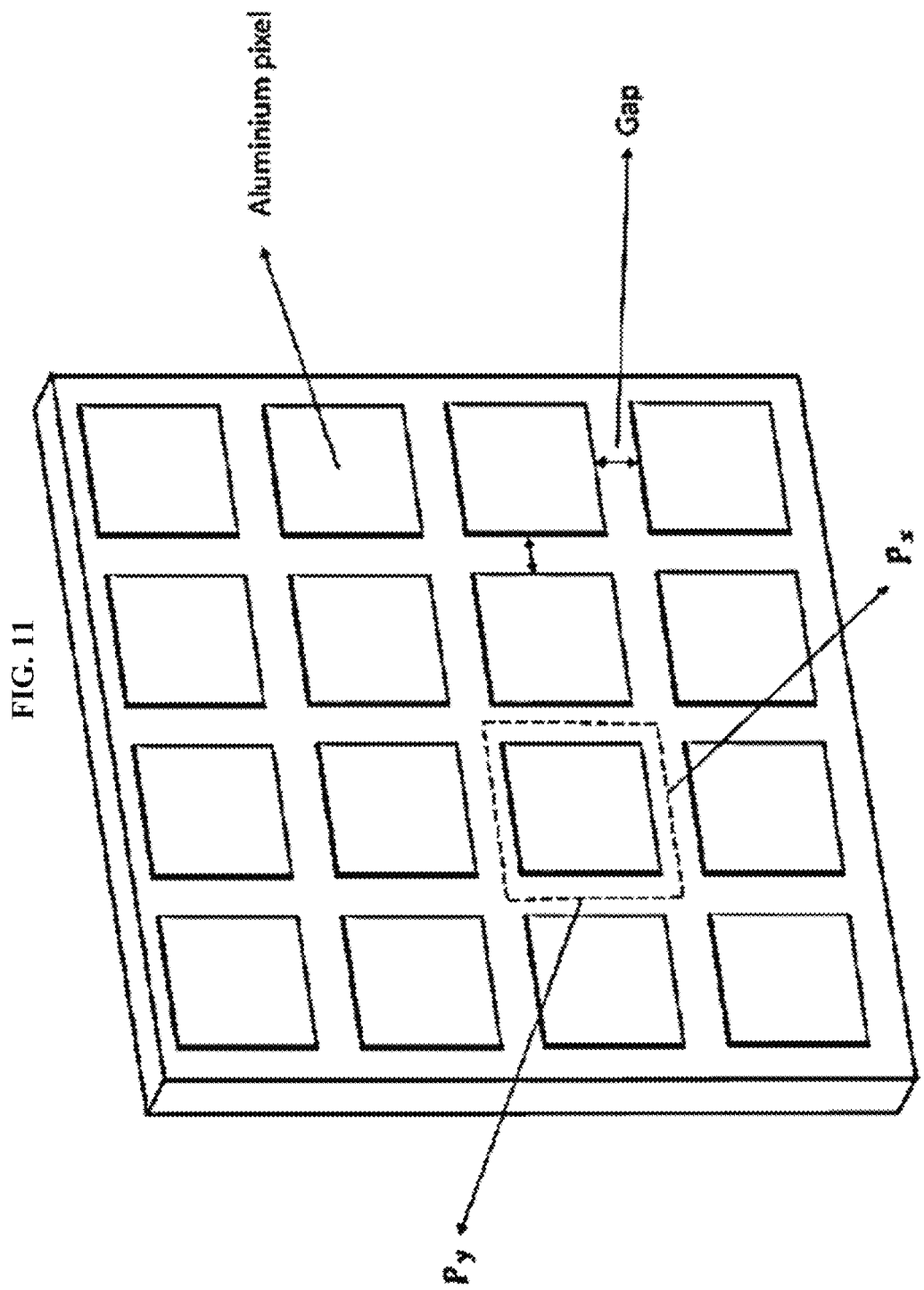
FIG. 11 is a schematic showing the back-plane of a Fabry-Perot spatial light modulator according to various embodiments with pixels arranged in a two-dimensional manner.
Figure 12:
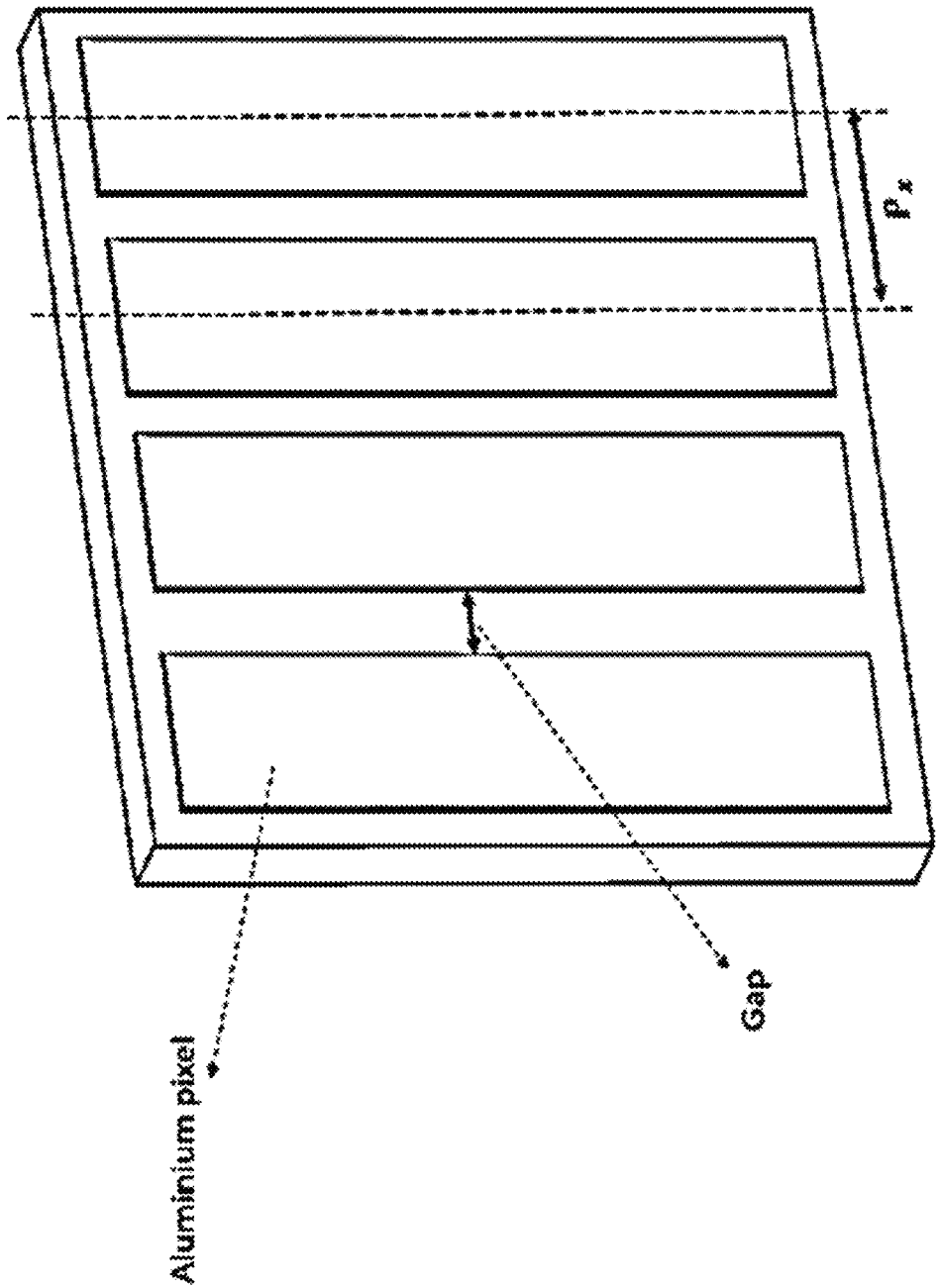
FIG. 12 is a schematic showing the back-plane of a Fabry-Perot spatial light modulator according to various embodiments with pixels arranged in a one-dimensional manner.

Various embodiments may have possible applications in holography and displays, as well as in complex beam shaping. In various embodiments, the individual pixels of the FP-SLM (as depicted in FIG. 3) may be periodically arranged in a two-dimensional fashion. FIG. 11 is a schematic showing the back-plane of a Fabry-Perot spatial light modulator according to various embodiments with pixels arranged in a two-dimensional manner. Only the back-plane of the device with the metallic patches is shown in FIG. 11. In various other embodiments, the individual pixels may be arranged in a one-dimensional fashion. FIG. 12 is a schematic showing the back-plane of a Fabry-Perot spatial light modulator according to various embodiments with pixels arranged in a one-dimensional manner. Similarly, only the back-plane of the device with the metallic patches is shown in FIG. 12. As seen from FIG. 12, the metal patches may be elongated in the direction perpendicular to the periodicity.

Various embodiments may be used in dynamic beam steering. Beam steering is the process of redirecting an incident light beam into a particular direction, given by a certain diffraction order, to which most of the incident power is channeled. In order to achieve the steering, the device has to be configured to impart a linear phase gradient on the wavefront of the incident light beam along a given direction, dφ/dx, where dφ denotes the phase shift and dr denotes the direction along which the phase gradient is imparted.

Usually, this gradient may be achieved via a change in a certain parameter. In various embodiments, this gradient may be provided via a change in the LC orientation angle. The phase gradient may be able to cover the full range of phases between 0 to 2π. In general, devices discretize the ideal continuous linear phase profile in a set of steps. In this way, if one has an "l" level system (i.e. "l" discrete steps), then the phase difference between each level is dφ/dx=2π/l, and the phase covered is from 0 to $$\left(2\pi - \frac{2\pi}{l}\right)$$

in steps of dφ/dx.

Figure 13:
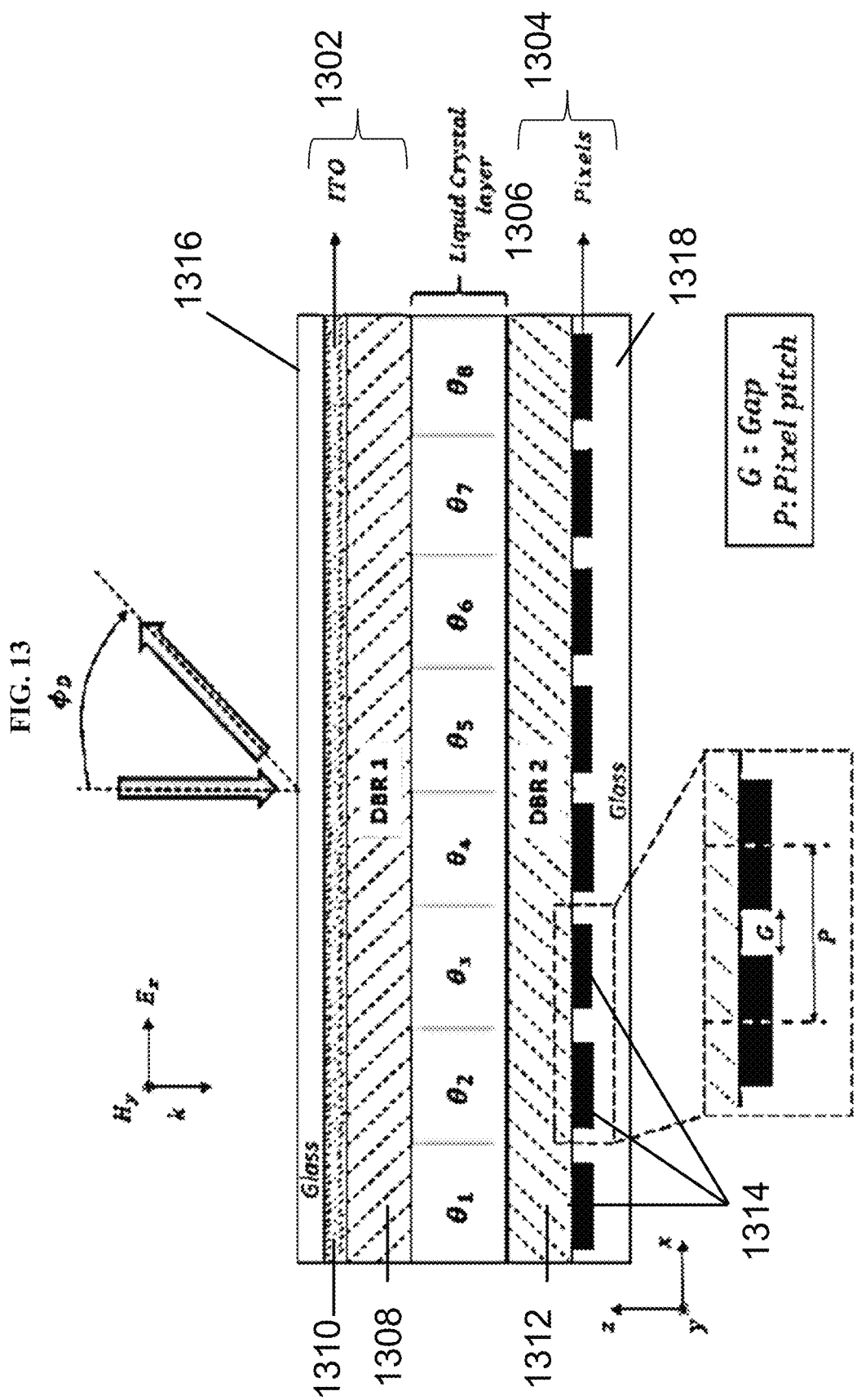
FIG. 13 is a schematic showing a cross-sectional side view of a unit-cell of a spatial light modulator (SLM) for beam steering using 8 discrete phase levels according to various embodiments.

FIG. 13 is a schematic showing a cross-sectional side view of a unit-cell of a spatial light modulator (SLM) for beam steering using 8 discrete phase levels according to various embodiments. The device may either be one-dimensional (as shown in FIG. 12) or two-dimensional (as shown in FIG. 11), depending on whether beam steering is required to be done in a single plane or full three-dimensional solid angle. The device may include a first reflector 1302, a second reflector 1304, and a liquid crystal (LC) layer 1306 between the first reflector 1302 and the second reflector 1304. The first reflector 1302 may include an upper distributed Bragg reflector 1308 and a first electrode 1310, e.g. a continuous, thin, transparent indium tin oxide (ITO) electrode. The second reflector 1304 may include a lower Bragg reflector 1312 and second electrodes 1314, e.g. aluminum (Al) patches. The spatial light modulator may further include superstrate 1316 and substrate 1318.

For illustration purposes, the one-dimensional arrangement is considered. While 8 discrete phase steps are considered in FIG. 13 for illustration, a single device may be reconfigured to obtain beam steering with any number of discrete levels. By changing the number of levels covering the 0 to 2π range, the steering angle may be dynamically modified. In this example, the 8 pixels may each be similar to the unit-cell shown in FIG. 3. The device in FIG. 13 may be obtained by periodically repeating the unit-cell shown in FIG. 3 eight times along the x-direction, such that the periodicity in the x direction $P_x=8\times P=8\times 550$ nm to account for the 8 pixels providing the 8 discrete phase levels. The periodicity in the y-direction may be set at $P_y=P=550$ nm. The configuration of the 8 pixels may be referred to as the "1×8" super cell, where the first number denotes the periodicity of the pixels in the y-direction and the second number the periodicity in the x-direction (such that $P_x=8\times P_y=8\times P$). The liquid crystal molecules in each of the 8 units or cells may independently be configured to provide different orientations of the LC director (and therefore different phase retardations to the incoming light) by applying a common voltage to the conductive oxide layer 1310 and different voltages to the different individual pixelated metal patches 1314 at the bottom.

The different orientations of the LCs are denoted as $\theta_1$ to $\theta_8$ in FIG. 13. The inset shows the zoomed-in view of the pixelated metal patches of two neighbouring pixels. The pixel pitch P is 550 nm and gap G is 50 nm. The width of each pixel (in both x and y directions) $w_{Al}$ is 500 nm. The grey coloured arrow on the top of FP-SLM device FIG. 13 (and pointing downwards in the z-direction) represents the incoming x-polarized light and the grey arrow pointing outwards of the device at an angle #n, represents the steered reflected light.

The plots of the phase shifts in FIGS. 10B, 10D and 10F may be used to calculate the LC orientations required at each wavelength (465 nm, 532 nm, 645 nm) to discretize the total phase shift of around 2π into 8 levels.

For an eight level system, the phase gradient may be chosen such that at each step $$d\phi/d\theta_{LC}=2\pi/8=\pi/4 \quad (4)$$

where $\theta_{LC}$ is the change in orientation angle of the LC director. The phase shift that is required for beam steering is from 0 to $1.75\pi$ (in steps of $0.25\pi$ (i.e. $\pi/4$)).

FIG. 14 is a table showing the values of the liquid crystal (LC) orientation angles $\theta_{LC}$ required at each wavelength to achieve beam steering in the spatial light modulator (SLM) according to various embodiments. For all cases (465 m, 532 nm, 645 nm), the value of the required $\theta_{LC}$ ($\theta_1$-$\theta_8$) lies between 0° to 60°.

Figure 15:
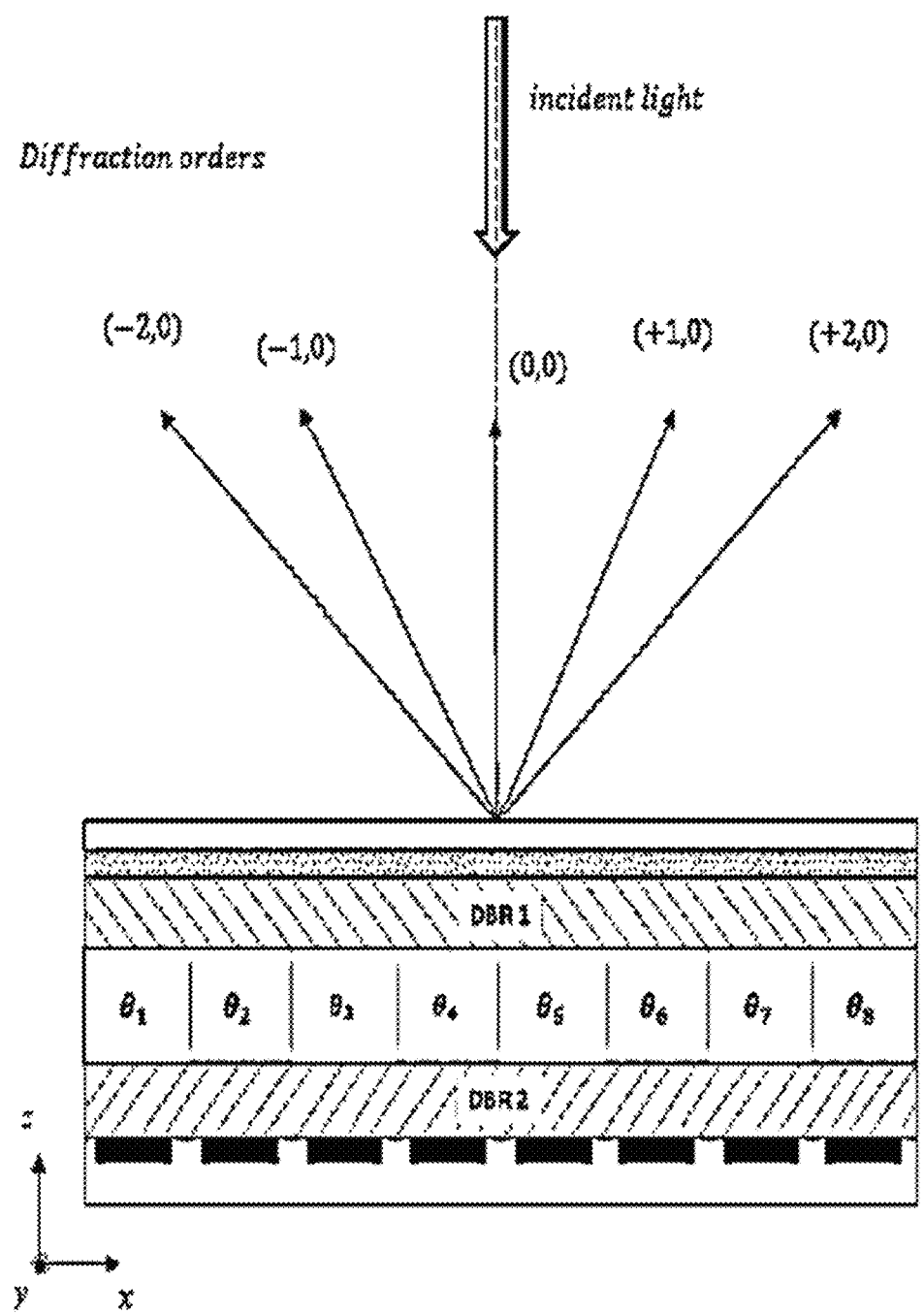
FIG. 15 is a schematic of the some of the diffraction orders supported by the spatial light modulator (SLM) shown in FIG. 13 according to various embodiments.

The phase gradient induced by the device is necessary to achieve the beam steering by concentrating most of the incident power into a single diffraction order. FIG. 15 is a schematic of the some of the diffraction orders supported by the spatial light modulator (SLM) shown in FIG. 13 according to various embodiments. In FIG. 15, x-polarized light is normally incident onto the device from the top along the z-direction. As the phase gradient change is along the x-direction, the diffraction of the reflected light occurs in the xy-plane. The first five diffraction orders are illustrated using the solid arrows, indicating the zeroth order (0,0), first orders (±1, 0) and the second orders (±2,0). While the modulator may support higher order modes, they are not shown here for the sake of clarity and because they are very weakly excited.

Figure 16A:
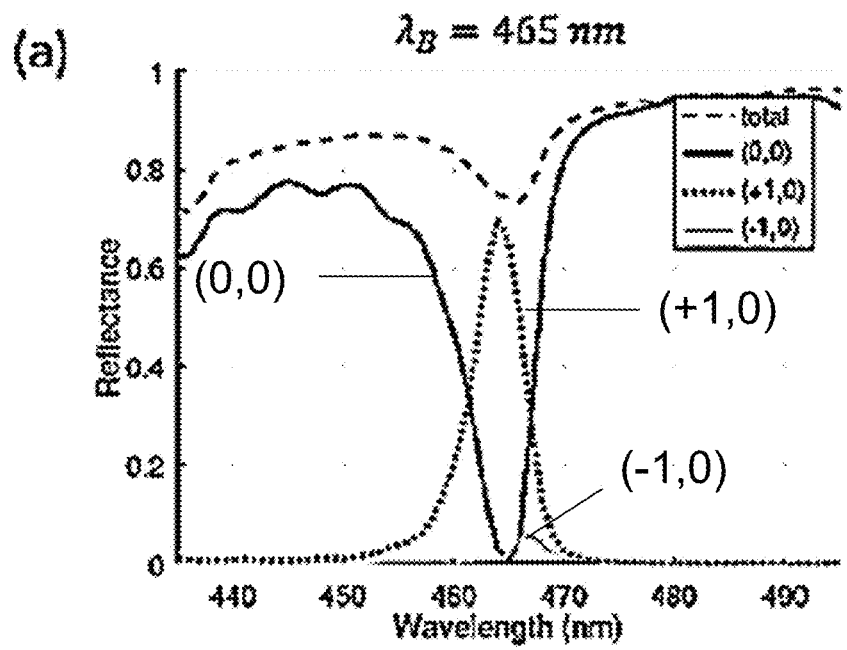
FIG. 16A is a plot of reflectance as a function of wavelength (in nanometers or nm) showing the reflectance of various orders of 465 nm light by the spatial light modulator according to various embodiments.
Figure 16B:
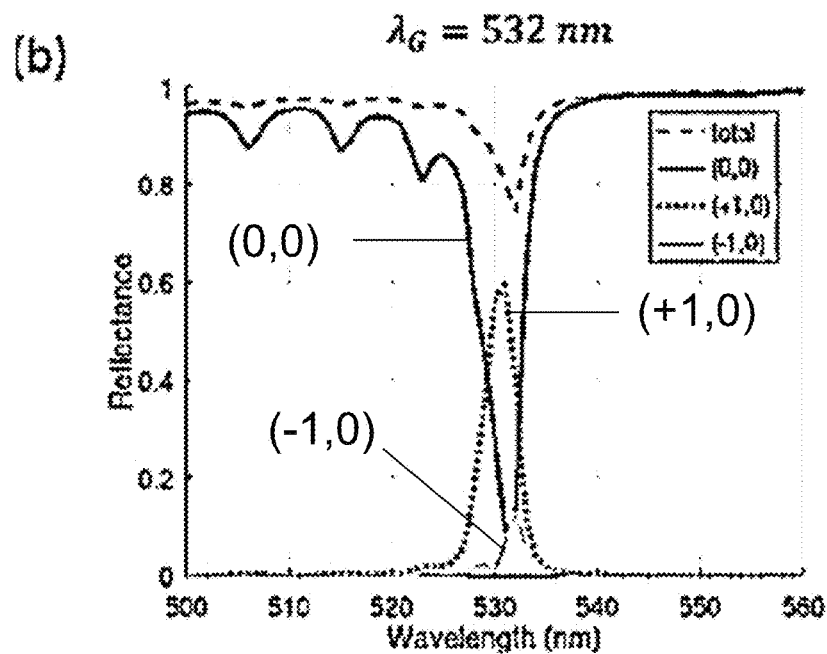
FIG. 16B is a plot of reflectance as a function of wavelength (in nanometers or nm) showing the reflectance of various orders of 532 nm light by the spatial light modulator according to various embodiments.
Figure 16C:
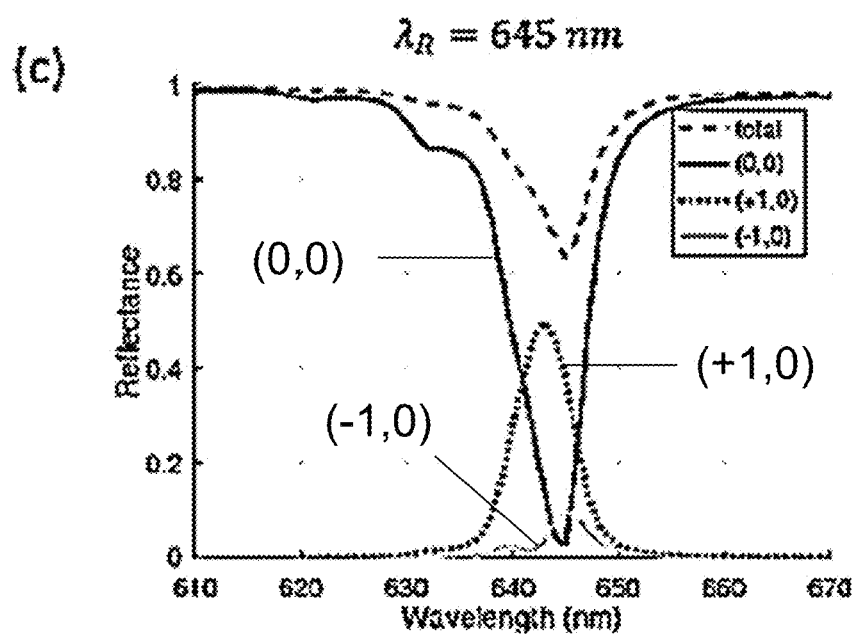
FIG. 16C is a plot of reflectance as a function of wavelength (in nanometers or nm) showing the reflectance of various orders of 645 nm light by the spatial light modulator according to various embodiments.

FIGS. 16A-C show the simulated results for the diffraction efficiencies (i.e. the power channeled into each of the diffraction orders divided by the power of the incident light) as a function of wavelength when the device is configured to provide the linear 0 to $2\pi$ phase profile at each of the three targeted wavelengths ($\lambda_B$=465 nm, $\lambda_G$=532 nm, $\lambda_R$=645 nm). FIG. 16A is a plot of reflectance as a function of wavelength (in nanometers or nm) showing the reflectance of various orders of 465 nm light by the spatial light modulator according to various embodiments. FIG. 16B is a plot of reflectance as a function of wavelength (in nanometers or nm) showing the reflectance of various orders of 532 nm light by the spatial light modulator according to various embodiments. FIG. 16C is a plot of reflectance as a function of wavelength (in nanometers or nm) showing the reflectance of various orders of 645 nm light by the spatial light modulator according to various embodiments. For each case, the required values of $\theta_{LC}$ ($\theta_1$-$\theta_8$) are taken from the table in FIG. 14. The reflectance for the diffraction orders is computed as a function of wavelength (400 nm-800 nm). For each of FIGS. 16A-C, the dashed black line represents the total reflectance, the solid black line represents the reflectance from the zeroth (0,0) diffraction order, the dotted black line represents the reflectance from the positive first diffraction order (+1,0), and the solid grey line represents the reflectance from the negative first diffraction order (−1,0).

As can be seen from FIGS. 16A-C, the FP-SLM device may be able to efficiently suppress the zeroth order mode and channel most of the power of the incident light into the positive first diffraction order (+1,0). The device also suppresses power channeling into the negative first diffraction order (−1,0), thus efficiently steering the incident light towards the direction given by the (+1,0) order.

FIG. 17 is a table showing the values of reflectance for the different diffraction orders at the three wavelengths of interest corresponding to three Fabry-Perot spatial light modulator (FP-SLM) configurations according to various embodiments. For the targeted wavelength $\lambda_B$=465 nm, the maximum reflectance for the first diffraction order (+1,0) occurs at $\lambda_m$=464 nm with around 70% efficiency (FIG. 17(a) and FIG. 16A). For the targeted wavelength $\lambda_G$=532 nm, the maximum reflectance for the first diffraction order (+1,0) occurs at $\lambda_m$=532 nm with around 60% efficiency (FIG. 17(b) and FIG. 16B). For the targeted wavelength $\lambda_R$=645 nm, the maximum reflectance for the first diffraction order (+1,0) occurs at $\lambda_m$=643 nm with around 50% efficiency (FIG. 17(c) and FIG. 16C). In all the cases, the zeroth order and the negative first order reflectance are strongly suppressed. Hence, the above data shows that various embodiments may be used to achieve efficient beam steering, and demonstrates that various embodiments may be used in LIDAR systems. Beyond this application, the high reflectance and high phase modulation provided by the FP-SLM and the small pixel size provided by various embodiments may also find use in holography, displays and projecting apparatuses with wide viewing angles as well as in high accuracy complex beam shaping.

Various embodiments may relate to an LCoS SLM based on Fabry Perot cavity resonances. Various embodiments may achieve high phase modulation and reflectance with a very thin (wavelength-scale) LC cell, which allows for shrinking the pixel size down to the wavelength or sub-wavelength dimensions, thus increasing resolution, field of view (FOV) and response speed while still been able to simultaneously operate at multiple discreet wavelengths within the visible spectrum. In various embodiments, the targeted wavelengths of the modulator may be the three primary colors in the visible spectrum, i.e. red (R), green (G) and blue (B) at wavelengths 645 nm, 532 nm and 465 nm respectively. In various embodiments, the associated phase modulation achieved at the wavelengths of interest may be $1.88\pi$ (645 nm), $1.96\pi$ (532 nm) and $1.96\pi$ (465 nm), which are close to the full range of $2\pi$. The associated reflectance at these wavelengths may be >46% (for 645 nm), >66% (for 532 nm) and >60% (for 465 nm). Various embodiments may have an advantage over other commercially available LCOS devices by having a thin LC cell, which results in faster response time and a small pixel size, which in turn gives higher field of view (FOV). Various embodiments may also have an advantage over nanoantenna based SLMs, in that it can operate at multiple wavelengths while having a comparably small pixel size. Various embodiments may have applications in three dimensional (3D) displays, two dimensional/three dimensional (2D/3D) dynamic holographic and augmented reality/virtual reality (AR/VR) displays as well as LIDAR.

Various embodiments may relate to a LC SLM device based on Fabry-Perot cavity resonance having thinner LC cell thickness (750 nm) and smaller pixel size (550 nm) compared to commercially available LCoS devices. Various embodiments may simultaneously operate at three different wavelengths in the visible region (RGB). Various embodiments may relate to a method of designing or forming the device. Various embodiments may relate to a method of operating the device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:
1. A spatial light modulator including:
a first reflector;

a second reflector; and a liquid crystal layer between the first reflector and the second reflector;

wherein the first reflector comprises a first electrode and a distributed Bragg reflector, the distributed Bragg reflector is disposed between the liquid crystal layer and the first electrode;

wherein the second reflector comprises a second electrode;

wherein the first reflector and the second reflector form a Fabry-Perot cavity; and wherein the second reflector further comprises a further distributed Bragg reflector, the further distributed Bragg reflector is disposed between the liquid crystal layer and the second electrode.

2. The spatial light modulator according to claim 1, wherein the first electrode comprises a continuous indium tin oxide layer.

3. The spatial light modulator according to claim 1, wherein the second electrode comprises a discontinuous aluminum layer.

4. The spatial light modulator according to claim 1, wherein the distributed Bragg reflector comprises a first plurality of layers of a first refractive index alternatively arranged with a second plurality of layers of a second refractive index different from the first refractive index.

5. The spatial light modulator according to claim 4,
wherein a real part of the first refractive index is greater than 2; and
wherein a real part of the second refractive index is smaller than 2.

6. The spatial light modulator according to claim 4,
wherein an imaginary part of the first refractive index is smaller than 0.1; and
wherein an imaginary part of the second refractive index is smaller than 0.1.

7. The spatial light modulator according to claim 4,
wherein the first plurality of layers of the first refractive index comprises titanium dioxide; and
wherein the second plurality of layers of the second refractive index comprises silicon dioxide.

8. The spatial light modulator according to claim 4,
wherein each layer of the first plurality of layers in a first portion of the distributed Bragg reflector has a first thickness;
wherein each layer of the first plurality of layers in a second portion of the distributed Bragg reflector has a second thickness different from the first thickness;
wherein each layer of the second plurality of layers in a first portion of the distributed Bragg reflector has a third thickness;
wherein each layer of the second plurality of layers in a second portion of the distributed Bragg reflector has a fourth thickness different from the third thickness.

9. The spatial light modulator according to claim 1,
wherein the spatial light modulator is configured to exhibit multiple resonances upon receiving incident light; and
wherein the spatial light modulator is configured such that frequencies of the multiple resonances shift upon varying a voltage difference applied between the first electrode and the second electrode.

10. The spatial light modulator according to claim 1, wherein the second reflector comprises one or more further second electrodes so that the second electrode and the one or more further second electrodes form a plurality of second electrodes.

11. The spatial light modulator according to claim 10, wherein liquid crystals comprised in different portions of the liquid crystal layer are configured to be oriented differently by applying a common voltage to the first electrode and different voltages to each of the plurality of second electrodes.

12. A method of forming a spatial light modulator, the method comprising:

forming a first reflector;

forming a second reflector; and forming a liquid crystal layer between the first reflector and the second reflector;

wherein the first reflector comprises a first electrode and a distributed Bragg reflector, the distributed Bragg reflector is disposed between the liquid crystal layer and the first electrode;

wherein the second reflector comprises a second electrode;

wherein the first reflector and the second reflector form a Fabry-Perot cavity; and wherein the second reflector further comprises a further distributed Bragg reflector, the further distributed Bragg reflector is disposed between the liquid crystal layer and the second electrode.

13. The method according to claim 12, wherein the distributed Bragg reflector comprises a first plurality of layers of a first refractive index alternatively arranged with a second plurality of layers of a second refractive index different from the first refractive index.

14. The method according to claim 13,
wherein each layer of the first plurality of layers in a first portion of the distributed Bragg reflector has a first thickness;
wherein each layer of the first plurality of layers in a second portion of the distributed Bragg reflector has a second thickness different from the first thickness;
wherein each layer of the second plurality of layers in a first portion of the distributed Bragg reflector has a third thickness;
wherein each layer of the second plurality of layers in a second portion of the distributed Bragg reflector has a fourth thickness different from the third thickness.

15. The method according to claim 12,
wherein the spatial light modulator is configured to exhibit multiple resonances upon receiving incident light; and
wherein the spatial light modulator is configured such that frequencies of the multiple resonances shift upon varying a voltage difference applied between the first electrode and the second electrode.

16. The method according to claim 12, wherein the second reflector comprises one or more further second electrodes so that the second electrode and the one or more further second electrodes form a plurality of second electrodes.

17. The method according to claim 16, wherein liquid crystals comprised in different portions of the liquid crystal layer are oriented differently by applying a common voltage to the first electrode and different voltages to each of the plurality of second electrodes.

18. The method according to claim 12, further comprising:

switching the liquid crystals by applying a potential difference or voltage across the first electrode and the second electrode.

* * * * *